(12) United States Patent
Park et al.

(10) Patent No.: US 10,911,110 B2
(45) Date of Patent: *Feb. 2, 2021

(54) METHOD FOR TRANSCEIVING CHANNEL STATE INFORMATION AND APPARATUS THEREFOR IN MULTIPLE-ANTENNA WIRELESS COMMUNICATION SYSTEM

(71) Applicant: LG ELECTRONICS INC., Seoul (KR)

(72) Inventors: Haewook Park, Seoul (KR); Jonghyun Park, Seoul (KR); Kijun Kim, Seoul (KR); Hyungtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/810,536

(22) Filed: Mar. 5, 2020

(65) Prior Publication Data

US 2020/0280352 A1 Sep. 3, 2020

Related U.S. Application Data

(63) Continuation of application No. 16/079,079, filed as application No. PCT/KR2017/002000 on Feb. 23, 2017, now Pat. No. 10,637,546.

(Continued)

(51) Int. Cl.
*H04B 7/0456* (2017.01)
*H04L 5/00* (2006.01)
*H04B 7/06* (2006.01)

(52) U.S. Cl.
CPC ......... *H04B 7/0456* (2013.01); *H04B 7/0469* (2013.01); *H04B 7/0478* (2013.01);
(Continued)

(58) Field of Classification Search
CPC .. H04B 7/0456; H04B 7/0626; H04B 7/0469; H04B 7/0478; H04B 7/0632; H04L 5/00
See application file for complete search history.

(56) References Cited

U.S. PATENT DOCUMENTS

2015/0172024 A1  6/2015  Kim et al.
2015/0215090 A1  7/2015  Sayana et al.
(Continued)

FOREIGN PATENT DOCUMENTS

KR  1020150140269  12/2015
WO  2014129842  8/2014

OTHER PUBLICATIONS

U.S. Appl. No. 16/079,079, Office Action dated Jul. 16, 2019, 14 pages.

(Continued)

*Primary Examiner* — Syed Haider
(74) *Attorney, Agent, or Firm* — Lee Hong Degerman Kang Waimey

(57) ABSTRACT

A method and an apparatus for transmitting and receiving channel state information in a multi-antenna wireless communication system are disclosed. Specifically, a method for reporting channel state information (CSI), by a User Equipment (UE), in a multi-antenna wireless communication system, the method comprising receiving, from a base station, configuration information for single CSI reporting in which a non-precoded CSI-RS based CSI reporting and a beamformed CSI-RS based CSI reporting are combined, reporting a first Precoding Matrix Indicator (PMI) and/or a first Rank Indicator (RI) derived based on a non-precoded CSI-RS to the base station, and reporting a Channel Quality Indicator (CQI), a second PMI, and a second RI based on a (Continued)

beamformed CSI-RS to the base station, wherein a value of the first RI is determined as only a value belonging to a previously determined set.

10 Claims, 19 Drawing Sheets

Related U.S. Application Data

(60) Provisional application No. 62/378,696, filed on Aug. 24, 2016, provisional application No. 62/350,196, filed on Jun. 15, 2016, provisional application No. 62/298,466, filed on Feb. 23, 2016.

(52) U.S. Cl.
CPC ......... *H04B 7/0626* (2013.01); *H04B 7/0632* (2013.01); *H04L 5/00* (2013.01)

(56) References Cited

U.S. PATENT DOCUMENTS

| | | |
|---|---|---|
| 2015/0288499 A1 | 10/2015 | Nam et al. |
| 2016/0007212 A1 | 1/2016 | Kim et al. |
| 2016/0294454 A1 | 10/2016 | Onggosanusi et al. |
| 2016/0359538 A1* | 12/2016 | Onggosanusi ........ H04L 5/0057 |
| 2017/0070277 A1* | 3/2017 | Si .......................... H04B 7/0456 |
| 2017/0078065 A1* | 3/2017 | Nam .................... H04B 7/0469 |
| 2017/0237478 A1* | 8/2017 | Kwak .................. H04B 7/0632 370/329 |
| 2018/0262252 A1 | 9/2018 | Oh et al. |
| 2018/0375561 A1 | 12/2018 | Park et al. |
| 2019/0132031 A1 | 5/2019 | Park et al. |

OTHER PUBLICATIONS

U.S. Appl. No. 16/079,079, Notice of Allowance dated Dec. 12, 2019, 11 pages.

PCT International Application No. PCT/KR2017/002000, International Search Report dated Jun. 15, 2017, 3 pages.

Samsung, "Discussions on Hybrid CSI-RS based schemes", 3GPP TSG RAN WG1 Meeting #82, R1-154182, Aug. 2015, 4 pages.

\* cited by examiner (a)

(b)

(a) Localized case (b) Distributed case

METHOD FOR TRANSCEIVING CHANNEL STATE INFORMATION AND APPARATUS THEREFOR IN MULTIPLE-ANTENNA WIRELESS COMMUNICATION SYSTEM

CROSS-REFERENCE TO RELATED APPLICATIONS

This application is a continuation of U.S. patent application Ser. No. 16/079,079, filed on Jan. 14, 2019, now U.S. Pat. No. 10,637,546, which is the National Stage filing under 35 U.S.C. 371 of International Application No. PCT/KR2017/002000, filed on Feb. 23, 2017, which claims the benefit of U.S. Provisional Application No. 62/298,466, filed on Feb. 23, 2016, 62/350,196, filed on Jun. 15, 2016, and 62/378,696, filed on Aug. 24, 2016, the contents of which are all hereby incorporated by reference herein in their entirety.

TECHNICAL FIELD

The present invention relates to a wireless communication system, and more particularly to a method and an apparatus for transmitting and receiving channel state information in a wireless communication system supporting a multi-antenna system (in particular, 2-dimensional active antenna system (2D AAS)).

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to propose a method transmitting and receiving channel state information in a wireless communication system supporting a multi-antenna system (in particular, 2D AAS).

An object of the present invention is to also propose a method for reporting hybrid CSI in which a non-precoded CSI-RS and a beamformed CSI-RS are mixed (combined).

An object of the present invention is to also propose a method for designing a codebook for hybrid CSI reporting.

Technical problems to be solved by the present invention are not limited by the above-mentioned technical problems, and other technical problems which are not mentioned above can be clearly understood from the following description by those skilled in the art to which the present invention pertains.

Technical Solution

In one aspect, there is provided a method for reporting channel state information (CSI), by a User Equipment (UE), in a multi-antenna wireless communication system, the method comprising receiving, from a base station, configuration information for single CSI reporting in which a non-precoded CSI-RS based CSI reporting and a beamformed CSI-RS based CSI reporting are combined, reporting a first Precoding Matrix Indicator (PMI) and/or a first Rank Indicator (RI) derived based on a non-precoded CSI-RS to the base station, and reporting a Channel Quality Indicator (CQI), a second PMI, and a second RI based on a beamformed CSI-RS to the base station, wherein a value of the first RI is determined as only a value belonging to a previously determined set.

In another aspect, there is provided a User Equipment (UE) for reporting channel state information (CSI) in a multi-antenna wireless communication system, the UE comprising a Radio Frequency (RF) unit for transmitting and receiving a radio signal, and a processor for controlling the RF unit, wherein the processor is configured to receive, from a base station, configuration information for single CSI reporting in which a non-precoded CSI-RS based CSI reporting and a beamformed CSI-RS based CSI reporting are combined, report a first Precoding Matrix Indicator (PMI) and/or a first Rank Indicator (RI) derived based on a non-precoded CSI-RS to the base station, and report a Channel Quality Indicator (CQI), a second PMI, and a second RI based on a beamformed CSI-RS to the base station, wherein a value of the first RI is determined as only a value belonging to a previously determined set.

Preferably, whether the first RI is reported may be determined depending on the maximum number of layers supported by the UE.

Preferably, when the maximum number of layers supported by the UE is 2 layers, the first RI may not be reported to the base station.

Preferably, when the maximum number of layers supported by the UE exceeds 2 layers, the first RI may be reported to the base station at 1-bit.

Preferably, when the maximum number of layers supported by the UE exceeds 2 layers, the first RI may be determined as a value belonging to a set {1, 3}.

Preferably, wherein a set of precoding matrixes may be determined by the first PMI selected in a previously determined codebook, and the beamformed CSI-RS may be applied to a precoding matrix belonging to the set of precoding matrixes.

Preferably, the first PMI may be selected in a codebook for an antenna port or some antenna ports of one dimension in a 2-dimensional antenna port array of the base station.

Preferably, the first PMI may be selected in a codebook without co-phasing.

Preferably, the first PMI may be selected in a codebook composed of only precoding matrixes for forming an orthogonal beam.

Preferably, a precoding matrix corresponding to the number of reported RIs may be selected in the codebook to constitute the set of precoding matrixes.

Preferably, a precoding matrix for an antenna port, that is not mapped to the set of precoding matrixes in an antenna port array of the base station, may be derived by a linear combination of precoding matrixes belonging to the set of precoding matrixes.

Preferably, a precoding matrix for an antenna port, that is not mapped to the set of precoding matrixes in an antenna port array of the base station, may be determined as one of precoding matrixes belonging to the set of precoding matrixes.

Preferably, an oversampling factor for configuring the codebook may be limited to a smaller value among oversampling factors for antenna ports of each dimension in a 2-dimensional antenna port of the base station.

Preferably, a spacing between sets of the precoding matrixes in the codebook may be limited to an exponentiation power of 2.

Advantageous Effects

Embodiments of the present invention can remarkably reduce a feedback overhead for channel state information reporting in a wireless communication system supporting a multi-antenna system (in particular, 2D AAS).

Embodiments of the present invention can report more accurate channel state information to a base station in consideration of an environment of a UE, such as a location and a moving state of the UE, in a wireless communication system supporting a multi-antenna system (in particular, 2D AAS).

Effects obtainable from the present invention are not limited by the above-mentioned effect, and other effects which are not mentioned above can be clearly understood from the following description by those skilled in the art to which the present invention pertains.

DESCRIPTION OF DRAWINGS

The accompanying drawings, which are included herein as a part of the description for help understanding the present invention, provide embodiments of the present invention, and describe the technical features of the present invention with the description below.

MODE FOR INVENTION

Figure 1:
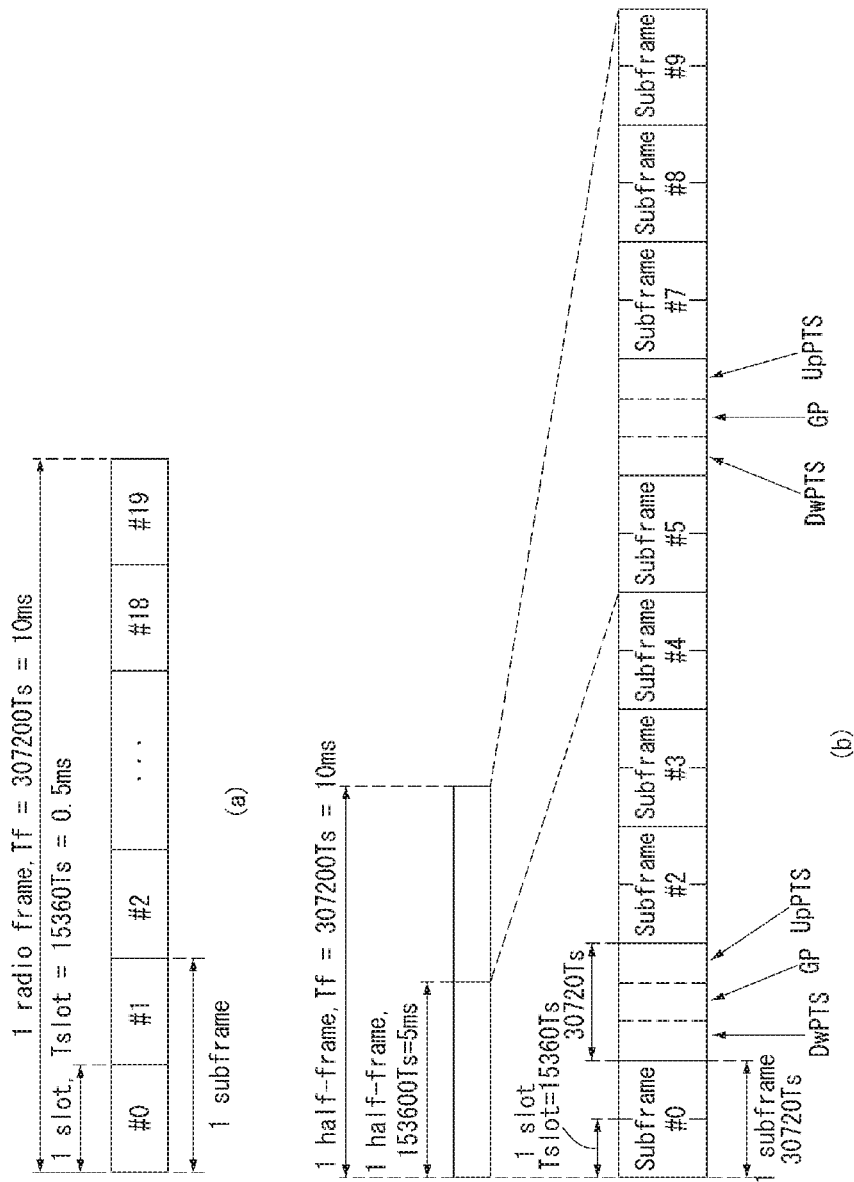
FIG. 1 illustrates the structure of a radio frame in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

Figure 3:
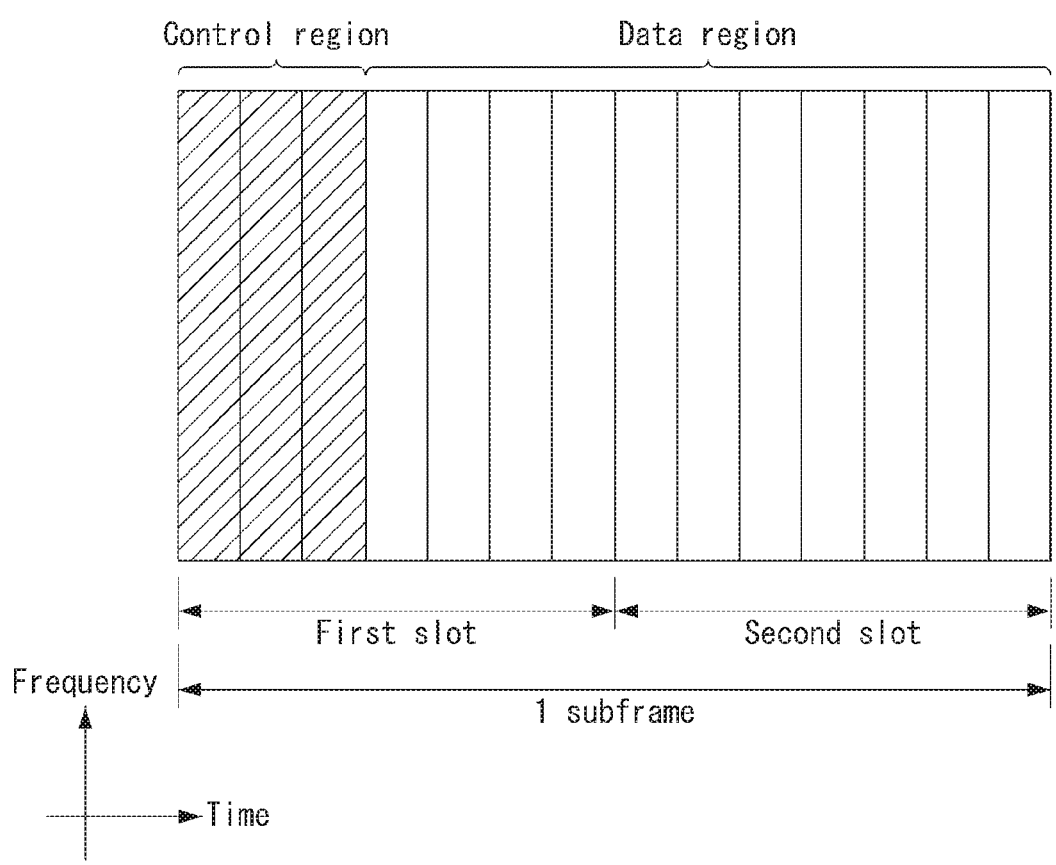
FIG. 3 illustrates a structure of downlink subframe in a wireless communication system to which the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
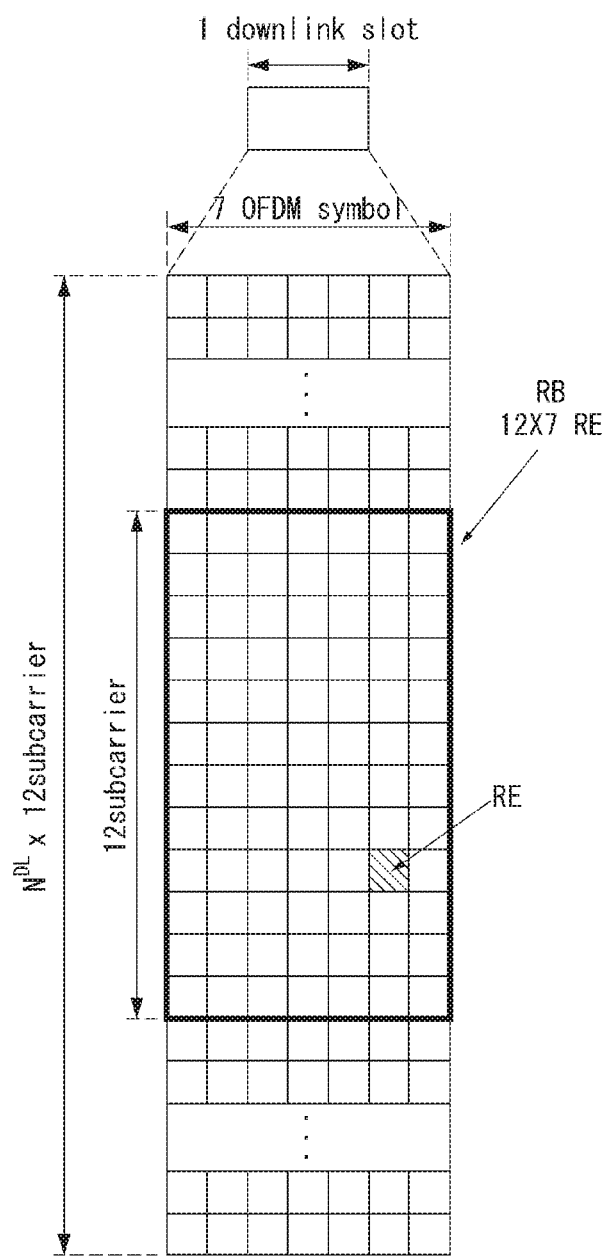
FIG. 2 is a diagram illustrating a resource grid for a downlink slot in a wireless communication system to which the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

(DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 4:
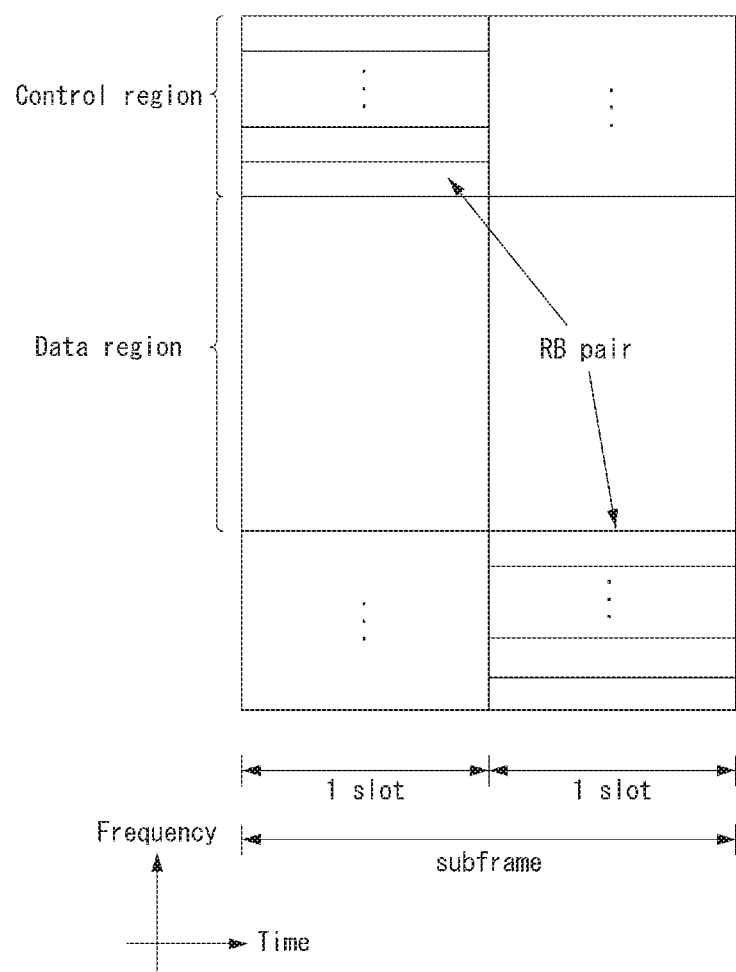
FIG. 4 illustrates a structure of uplink subframe in a wireless communication system to which the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
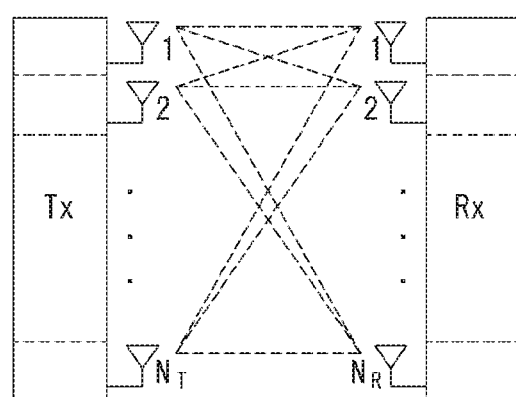
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \qquad [\text{Equation 1}]$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s=[s_1,s_2,\ldots,s_{N_T}]^T \qquad \text{[Equation 2]}$$

Meanwhile, transmission power may be different in each of pieces of transmission information s_1, s_2, ..., s_NT. In this case, if pieces of transmission power are P_1, P_2, ..., P_NT, transmission information having controlled transmission power may be represented using the following vector.

$$\hat{s}=[\hat{s}_1,\hat{s}_2,\ldots,\hat{s}_{N_T}]^T=[P_1s_1,P_2s_2,\ldots,P_{N_T}s_{N_T}]^T \qquad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} \hat{s}_1 \\ \hat{s}_2 \\ \vdots \\ \hat{s}_{N_T} \end{bmatrix} = Ps \qquad \text{[Equation 4]}$$

Meanwhile, the information vector having controlled transmission power in the Equation 4 is multiplied by a weight matrix W, thus forming N_T transmission signals x_1, x_2, ..., x_NT that are actually transmitted. In this case, the weight matrix functions to properly distribute the transmission information to antennas according to a transport channel condition. The following may be represented using the transmission signals x_1, x_2, ..., x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

In this case, w_ij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, ..., y_NR of the respective antennas are represented as follows using a vector y.

$$y=[y_1,y_2,\ldots,y_{N_R}]^T \qquad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
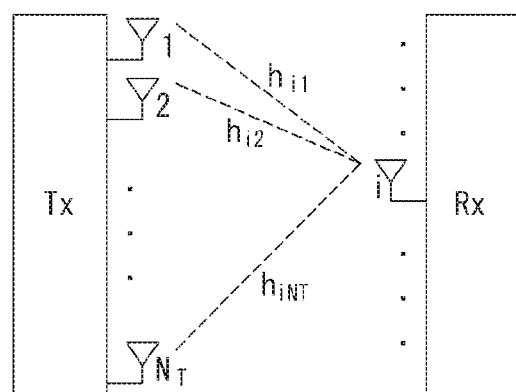
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T=[h_{i1},h_{i2},\ldots,h_{iN_T}] \qquad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \vdots \\ h_{i1} & h_{i2} & \ldots & h_{iN_T} \\ \vdots & & \ddots & \vdots \\ h_{N_R1} & h_{N_R2} & \ldots & h_{N_RN_T} \end{bmatrix} \qquad \text{[Equation 8]}$$

Meanwhile, Additive White Gaussian Noise (AWGN) is added to an actual channel after the actual channel experiences the channel matrix H. Accordingly, AWGN n_1, n_2, ..., n_NR added to the N_R reception antennas, respectively, are represented using a vector as follows.

$$n=[n_1,n_2,\ldots,n_{N_R}]^T \qquad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y \\ \vdots \\ y_{N_R} \end{bmatrix} = \begin{bmatrix} h_{11} & h_{12} & \cdots & h_{1N_T} \\ h_{21} & h_{22} & \cdots & h_{2N_y} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$

[Equation 10]

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Hereinafter, in relation to the MIMO transport techniques described above, a codebook-based precoding technique will be described in detail.

Figure 7:
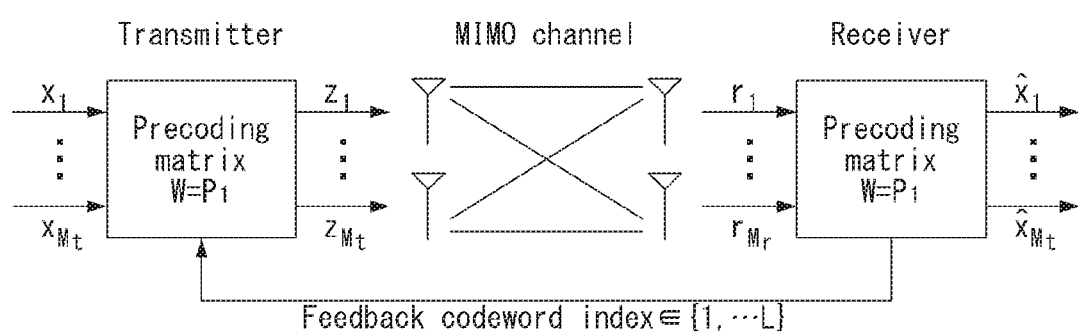
FIG. 7 is a diagram for describing a basic concept of a codebook-based precoding in a wireless communication system to which the present invention may be applied.

FIG. 7 is a diagram for describing a basic concept of a codebook-based precoding in a wireless communication system to which the present invention may be applied.

According to the codebook-based precoding technique, a transmitting-end and a receiving end share codebook information that includes a predetermined number of precoding matrixes according to a transmission rank, the number of antennas, and so on.

That is, in the case that feedback information is finite, the precoding-based codebook technique may be used.

A receiving-end may measure a channel state through a receiving signal, and may feedback a finite number of preferred matrix information (i.e., index of the corresponding precoding matrix) based on the codebook information described above. For example, a receiving-end may measure a signal in Maximum Likelihood (ML) or Minimum Mean Square Error (MMSE) technique, and may select an optimal precoding matrix.

FIG. 7 shows that a receiving-end transmits the precoding matrix information for each codeword to a transmitting-end, but the present invention is not limited thereto.

The transmitting-end that receives the feedback information from the receiving-end may select a specific precoding matrix from the codebook based on the received information. The transmitting-end that selects the precoding matrix may perform precoding in a manner of multiplying layer signals, of which number amounts to a transmission rank, by the selected precoding matrix and may transmit the precoded transmission signal via a plurality of antennas. The number of rows in a precoding matrix is equal to the number of antennas, while the number of columns is equal to a rank value. Since the rank value is equal to the number of layers, the number of the columns is equal to the number of the layers. For instance, when the number of transmitting antennas and the number of layers are 4 and 2, respectively, a precoding matrix may include 4×2 matrix. Equation 12 below represents an operation of mapping information mapped to each layer to a respective antenna through the precoding matrix in the case.

$$\begin{bmatrix} y_1 \\ y_2 \\ y_3 \\ y_4 \end{bmatrix} = \begin{bmatrix} p_{11} & y_1 \\ p_{12} & y_1 \\ p_{13} & y_1 \\ p_{14} & y_1 \end{bmatrix} \cdot \begin{bmatrix} x_1 \\ x_2 \end{bmatrix} \quad \text{[Equation 12]}$$

Referring to Equation 12, information mapped to a layer includes x1 and x2 and each element pij of 4×2 matrix is a weight used for precoding. y1, y2, y3 and y4 indicate information mapped to antennas and may be transmitted via corresponding antennas by OFDM transmission schemes, respectively.

The receiving-end that receives the signal precoded and transmitted in the transmitting-end may reconstruct the received signal by performing inverse processing of the precoding performed in the transmitting-end. Generally, since a precoding matrix satisfies such a unitary matrix (U) condition as 'U*UH=I' (herein, UˆH means an Hermit matrix of matrix U), the above-mentioned inverse processing of the precoding may be performed in a manner of multiplying the received signal by Hermit matrix PH of the precoding matrix P used for the precoding performed by the transmitting-end.

In addition, since the precoding is requested to have good performance for antenna configurations of various types, it may be necessary to consider performance for various antenna configurations in codebook design. In the following description, an exemplary configuration of multiple antennas is explained.

In the conventional 3GPP LTE system (e.g., system according to 3GPP LTE Release-8 or Release-9 Standard), since maximum four transmission antennas are supported in DL, a codebook for four transmission antennas is designed. In the 3GPP LTE-A system evolved from the conventional 3GPP LTE system, maximum eight transmission antennas may be supported in DL. Accordingly, it may be necessary to design a precoding codebook that provides good performance for a DL transmission via maximum eight transmission antennas.

Moreover, when a codebook is designed, generally required are constant modulus property, finite alphabet, restriction on a codebook size, nested property, and providing good performance for various antenna configurations.

The constant modulus property means a property that amplitude of each channel component of a precoding matrix configuring a codebook is constant. According to this property, no matter what kind of a precoding matrix is used, power levels transmitted from all antennas may be maintained equal to each other. Hence, it may be able to raise efficiency in using a power amplifier.

The finite alphabet means to configure precoding matrixes using quadrature phase shift keying (QPSK) alphabet (i.e., ±1, ±j) only except a scaling factor in the case of two transmitting antennas, for example. Accordingly, when multiplication is performed on a precoding matrix by a precoder, it may alleviate the complexity of calculation.

The codebook size may be restricted as a predetermined size or smaller. Since a size of a codebook increases, precoding matrixes for various cases may be included in the codebook, and accordingly, a channel status may be more accurately reflected. However, the number of bits of a precoding matrix indicator (PMI) correspondingly increases to cause signaling overhead.

The nested property means that a portion of a high rank precoding matrix is configured with a low rank precoding matrix. Thus, when the corresponding precoding matrix is configured, an appropriate performance may be guaranteed even in the case that a BS determines to perform a DL transmission of a transmission rank lower than a channel rank indicated by a rank indicator (RI) reported from a UE. In addition, according to this property, complexity of channel quality information (CQI) calculation may be reduced. This is because calculation for a precoding matrix selection may be shared in part when an operation of selecting a precoding matrix from precoding matrixes designed for different ranks is performed.

Providing good performance for various antenna configurations may mean that providing performance over a predetermined level is required for various cases including a low correlated antenna configuration, a high correlated antenna configuration, a cross-polarized antenna configuration and the like.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

Figure 8:
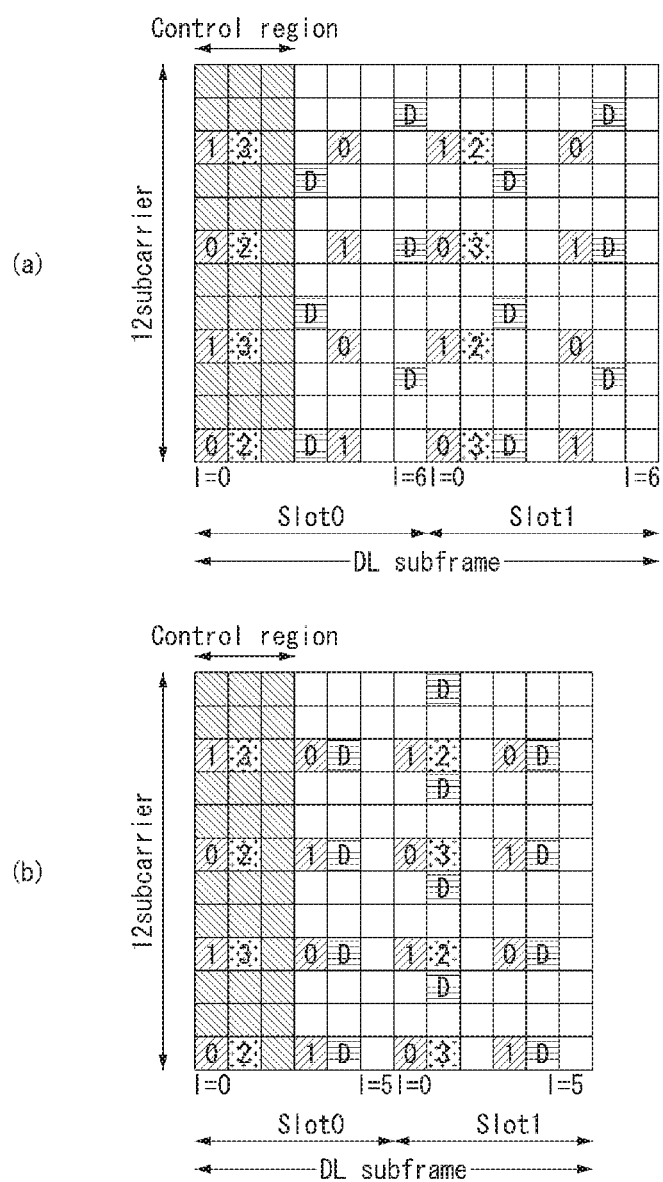
FIG. 8 illustrates reference signal patterns mapped to downlink resource block pairs in a wireless communication system to which the present invention may be applied.

FIG. 8 illustrates reference signal patterns mapped to downlink resource block pairs in a wireless communication system to which the present invention may be applied.

Referring to FIG. 8, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 8a) and has a length of 12 OFDM symbols in the case of an extended cyclic prefix (CP) (FIG. 8b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, if the number of transmission antennas of an eNB is two, CRSs for a No. 0 antenna port and a No. 1 antenna port are transmitted. If the number of transmission antennas of an eNB is four, CRSs for No. 0-No. 3 antenna ports are transmitted. If the number of transmission antennas of an eNB is four, a CRS pattern in one RB is shown in FIG. 8.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

A DRS is described in more detail below. The DRS is used to demodulate data. In multi-input multi-output antenna transmission, precoding weight used for a specific UE is combined with a transmission channel transmitted by each transmission antenna when the UE receives an RS, and is used to estimate a corresponding channel without any change.

A 3GPP LTE system (e.g., Release-8) supports a maximum of four transmission antennas, and a DRS for rank 1 beamforming is defined. The DRS for rank 1 beamforming also indicates an RS for an antenna port index 5.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

For data demodulation, a DM-RS is dedicatedly transmitted to a UE scheduled in a corresponding time-frequency domain. That is, a DM-RS for a specific UE is transmitted only in a region in which the corresponding UE has been scheduled, that is, in the time-frequency domain in which data is received.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

For data demodulation, a DM-RS is dedicatedly transmitted to a UE scheduled in a corresponding time-frequency domain. That is, a DM-RS for a specific UE is transmitted only in the region in which scheduling is performed for the corresponding UE, that is, only in the time-frequency domain in which data is received.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined for only a subcarrier spacing Δf=15 kHz.

In a subframe configured for CSI-RS transmission, a CSI-RS sequence is mapped to a complex-valued modulation symbol a_k,l^(p) used as a reference symbol on each antenna port p as in Equation 13.

$$a_{k,l}^{(p)} = w_{l''} \cdot r_{l,n_s}(m') \quad \text{[Equation 13]}$$

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l'' + \begin{cases} l'' & \text{CSI reference signal configurations } 0-19, \text{ normal cyclic prefix} \\ 2l'' & \text{CSI reference signal configurations } 20-31, \text{ normal cyclic prefix} \\ l'' & \text{CSI reference signal configurations } 0-27, \text{ extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 13, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k', l') from a CSI-RS configuration in a normal CP.

TABLE 3

| CSI reference signal configuration | | Number of CSI reference signals configured | | | | |
|---|---|---|---|---|---|---|
| | | 1 or 2 | | 4 | | 8 |
| | | (k', l') | n_s mod 2 | (k', l') | n_s mod 2 | (k', l') | n_s mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |

TABLE 3-continued

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 18 | (3, 5) | 1 | | | | |
| | 19 | (2, 5) | 1 | | | | |
| Frame | 20 | (11, 1) | 1 | (11, 1) | 1 | (11, 1) | 1 |
| structure | 21 | (9, 1) | 1 | (9, 1) | 1 | (9, 1) | 1 |
| type 2 | 22 | (7, 1) | 1 | (7, 1) | 1 | (7, 1) | 1 |
| only | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 4 illustrates the mapping of (k', l') from a CSI-RS configuration in an extended CP.

TABLE 4

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Fram | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame | 16 | (11, 1) | 1 | (11, 1) | 1 | (11, 1) | 1 |
| structure | 17 | (10, 1) | 1 | (10, 1) | 1 | (10, 1) | 1 |
| type 2 | 18 | (9, 1) | 1 | (9, 1) | 1 | (9, 1) | 1 |
| only | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k', l') and n_s are determined depending on a CSI-RS configuration based on Table 3 and Table 4, and time-frequency resources used for CSI-RS transmission are determined depending on each CSI-RS antenna port.

Figure 9:
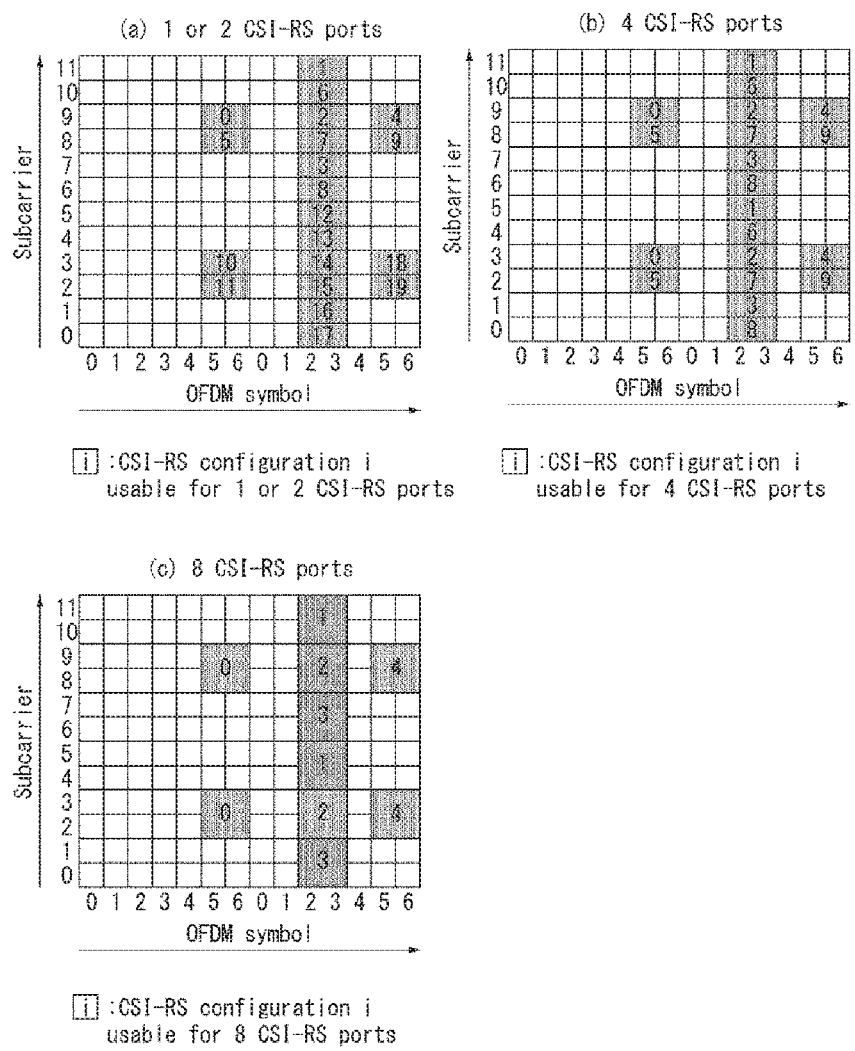
FIG. 9 is a diagram illustrating resources to which reference signals are mapped in a wireless communication system to which the present invention may be applied.

FIG. 9 is a diagram illustrating resources to which reference signals are mapped in a wireless communication system to which the present invention may be applied.

FIG. 9(a) shows twenty types of CSI-RS configurations available for CSI-RS transmission by one or two CSI-RS antenna ports, FIG. 9(b) shows ten types of CSI-RS configurations available for four CSI-RS antenna ports, and FIG. 9(c) shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 9(a).

Likewise, when four antenna ports are configured for CSI-RS transmission with respect to a specific cell, a CSI-RS is transmitted on radio resources on a configured CSI-RS configuration of the ten types of CSI-RS configurations shown in FIG. 9(b). Furthermore, when eight antenna ports are configured for CSI-RS transmission with respect to a specific cell, a CSI-RS is transmitted on radio resources on a configured CSI-RS configuration of the five types of CSI-RS configurations shown in FIG. 9(c).

A CSI-RS for each antenna port is subjected to CDM for every two antenna ports (i.e., {15, 16}, {17, 18}, {19, 20} and {21, 22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1 −1] and mapped to the same radio resources. The same is true of the antenna ports {17, 18}, {19, 20} and {21, 22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1 −1] multiplied in order to detect the CSI-RS for the antenna port 16.

Referring to FIG. 9(a) to 9(c), in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

A plurality of CSI-RS configurations may be used in one cell. 0 or one CSI-RS configuration may be used for a non-zero power (NZP) CSI-RS, and 0 or several CSI-RS configurations may be used for a zero power (ZP) CSI-RS.

For each bit set to 1 in a zeropower (ZP) CSI-RS ('ZeroPowerCSI-RS') that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15, 16}, S={17, 18}, S={19, 20} or S={21, 22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T_CSI-RS and a subframe offset Δ_CSI-RS for CSI-RS transmission are shown in Table 5.

Table 5 illustrates CSI-RS subframe configurations.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0–4 | 5 | $I_{CSI-RS}$ |
| 5–14 | 10 | $I_{CSI-RS}$ − 5 |
| 15–34 | 20 | $I_{CSI-RS}$ − 15 |
| 35–74 | 40 | $I_{CSI-RS}$ − 35 |
| 75–154 | 80 | $I_{CSI-RS}$ − 75 |

Referring to Table 5, the CSI-RS transmission period T_CSI-RS and the subframe offset Δ_CSI-RS are determined depending on the CSI-RS subframe configuration I_CSI-RS.

The CSI-RS subframe configuration of Table 5 may be configured as one of the aforementioned 'SubframeConfig' field and 'zeroTxPowerSubframeConfig' field. The CSI-RS subframe configuration may be separately configured with respect to an NZP CSI-RS and a ZP CSI-RS.

A subframe including a CSI-RS satisfies Equation 14.

$$(10n_f + \lfloor n_s/2 \rfloor - \Delta_{CSI-RS}) \bmod T_{CSI-RS} = 0 \qquad \text{[Equation 14]}$$

In Equation 13, T_CSI-RS means a CSI-RS transmission period, Δ_CSI-RS means a subframe offset value, n_f means a system frame number, and n_s means a slot number.

In the case of a UE in which the transmission mode 9 has been configured with respect to a serving cell, one CSI-RS resource configuration may be configured for the UE. In the case of a UE in which the transmission mode 10 has been configured with respect to a serving cell, one or more CSI-RS resource configuration (s) may be configured for the UE.

In the current LTE standard, a CSI-RS configuration includes an antenna port number (antennaPortsCount), a subframe configuration (subframeConfig), and a resource configuration (resourceConfig). Accordingly, the a CSI-RS configuration provides notification that a CSI-RS is transmitted how many antenna port, provides notification of the period and offset of a subframe in which a CSI-RS will be transmitted, and provides notification that a CSI-RS is transmitted in which RE location (i.e., a frequency and OFDM symbol index) in a corresponding subframe.

Specifically, the following parameters for each CSI-RS (resource) configuration are configured through high layer signaling.

If the transmission mode 10 has been configured, a CSI-RS resource configuration identifier A CSI-RS port number (antennaPortsCount): a parameter (e.g., one CSI-RS port, two CSI-RS ports, four CSI-RS ports or eight CSI-RS ports) indicative of the number of antenna ports used for CSI-RS transmission A CSI-RS configuration (resourceConfig) (refer to Table 3 and Table 4): a parameter regarding a CSI-RS allocation resource location A CSI-RS subframe configuration (subframeConfig, that is, I_CSI-RS) (refer to Table 5): a parameter regarding the period and/or offset of a subframe in which a CSI-RS will be transmitted If the transmission mode 9 has been configured, transmission power P_C for CSI feedback: in relation to the assumption of a UE for reference PDSCH transmission power for feedback, when the UE derives CSI feedback and takes a value within a [−8, 15] dB range in a 1-dB step size, P_C is assumed to be the ratio of energy per resource element (EPRE) per PDSCH RE and a CSI-RS EPRE.

If the transmission mode 10 has been configured, transmission power P_C for CSI feedback with respect to each CSI process. If CSI subframe sets C_CSI,0 and C_CSI,1 are configured by a high layer with respect to a CSI process, P_C is configured for each CSI subframe set in the CSI process.

A pseudo-random sequence generator parameter n_ID

If the transmission mode 10 has been configured, a high layer parameter 'qcl-CRS-Info-r11' including a QCL scrambling identifier for a quasico-located (QCL) type B UE assumption (qcl-ScramblingIdentity-r11), a CRS port count (crs-PortsCount-r11), and an MBSFN subframe configuration list (mbsfn-SubframeConfigList-r11) parameter.

When a CSI feedback value derived by a UE has a value within the [−8, 15] dB range, P_C is assumed to be the ration of PDSCH EPRE to CSI-RS EPRE. In this case, the PDSCH EPRE corresponds to a symbol in which the ratio of PDSCH EPRE to CRS EPRE is $\rho\_A$.

A CSI-RS and a PMCH are not configured in the same subframe of a serving cell at the same time.

In the frame structure type 2, if four CRS antenna ports have been configured, a CSI-RS configuration index belonging to the [20-31] set (refer to Table 3) in the case of a normal CP or a CSI-RS configuration index belonging to the [16-27] set (refer to Table 4) in the case of an extended CP is not configured in a UE.

A UE may assume that the CSI-RS antenna port of a CSI-RS resource configuration has a QCL relation with delay spread, Doppler spread, Doppler shift, an average gain and average delay.

A UE in which the transmission mode 10 and the QCL type B have been configured may assume that antenna ports 0-3 corresponding to a CSI-RS resource configuration and antenna ports 15-22 corresponding to a CSI-RS resource configuration have QCL relation with Doppler spread and Doppler shift.

In the case of a UE in which the transmission modes 1-9 have been configured, one ZP CSI-RS resource configuration may be configured in the UE with respect to a serving cell. In the case of a UE in which the transmission mode 10 has been configured, one or more ZP CSI-RS resource configurations may be configured in the UE with respect to a serving cell.

The following parameters for a ZP CSI-RS resource configuration may be configured through high layer signaling.

The ZP CSI-RS configuration list (zeroTxPowerResourceConfigList) (refer to Table 3 and Table 4): a parameter regarding a zero-power CSI-RS configuration The ZP CSI-RS subframe configuration (eroTxPowerSubframeConfig, that is, I_CSI-RS) (refer to Table 5): a parameter regarding the period and/or offset of a subframe in which a zero-power CSI-RS is transmitted A ZP CSI-RS and a PMCH are not configured in the same subframe of a serving cell at the same time.

In the case of a UE in which the transmission mode 10 has been configured, one or more channel state information-interference measurement (CSI-IM) resource configurations may be configured in the UE with respect to a serving cell.

The following parameters for each CSI-IM resource configuration may be configured through high layer signaling.

The ZP CSI-RS configuration (refer to Table 3 and Table 4)

The ZP CSI RS subframe configuration I_CSI-RS (refer to Table 5)

A CSI-IM resource configuration is the same as any one of configured ZP CSI-RS resource configurations.

A CSI-IM resource and a PMCH are not configured within the same subframe of a serving cell at the same time.

Massive MIMO

A MIMO system having a plurality of antennas may be called a massive MIMO system and has been in the spotlight as means for improving spectrum efficiency, energy efficiency and processing complexity.

In recent 3GPP, in order to satisfy the requirements of spectrum efficiency for a future mobile communication system, a discussion about the massive MIMO system has started. The massive MIMO is also called full-dimension MIMO (FD-MIMO).

In a wireless communication system after LTE Release (Rel)-12, the introduction of an active antenna system (AAS) is considered.

Unlike the existing passive antenna system in which an amplifier and antenna capable of adjusting the phase and size of a signal have been separated, the AAS means a system in which each antenna is configured to include an active element, such as an amplifier.

The AAS does not require a separate cable, connector and other hardware for connecting an amplifier and an antenna because the active antenna is used, and thus has a high efficiency characteristic in terms of energy and operating costs. In particular, the AAS enables an advanced MIMO technology, such as the formation of an accurate beam pattern or 3D beam pattern in which a beam direction and a beam width are considered because the AAS supports each electronic beam control method.

Due to the introduction of an advanced antenna system, such as the AAS, a massive MIMO structure having a plurality of input/output antennas and a multi-dimension antenna structure is also considered. For example, unlike in the existing straight type antenna array, if a two-dimensional (2D) antenna array is formed, a 3D beam pattern can be formed by the active antenna of the AAS.

Figure 10:
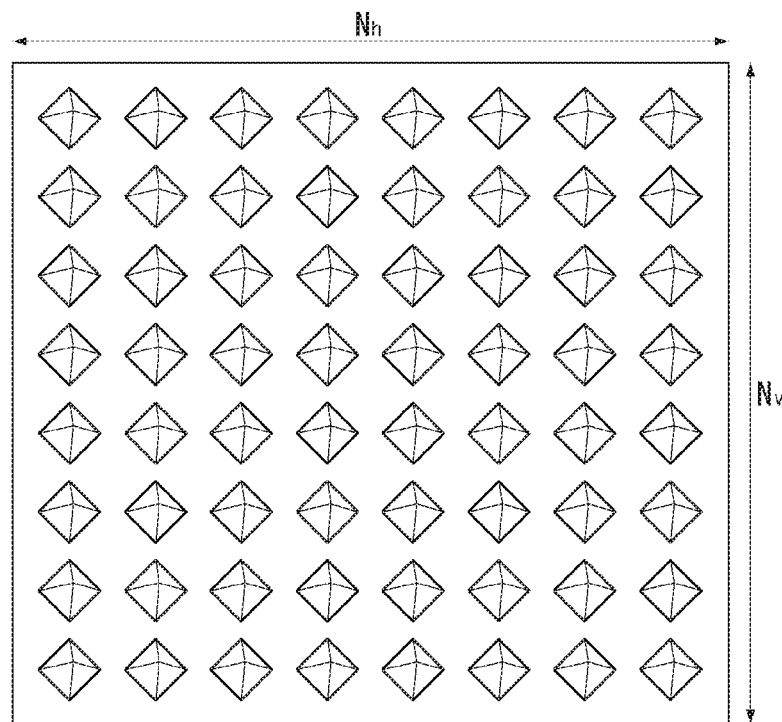
FIG. 10 illustrates a 2D-AAS having 64 antenna elements in a wireless communication system to which the present invention may be applied.

FIG. 10 illustrates a 2D-AAS having 64 antenna elements in a wireless communication system to which the present invention may be applied.

FIG. 10 illustrates a common 2D antenna array. A case where $N\_t = N\_v \cdot N\_h$ antennas has a square form as in FIG. 10 may be considered. In this case, N_h indicates the number of antenna columns in a horizontal direction, and N_v indicates the number of antenna rows in a vertical direction.

If the antenna array of such a 2D structure is used, radio waves can be controlled both in the vertical direction (elevation) and the horizontal direction (azimuth) so that a transmission beam can be controlled in the 3D space. A wavelength control mechanism of such a type may be called 3D beamforming.

Figure 11:
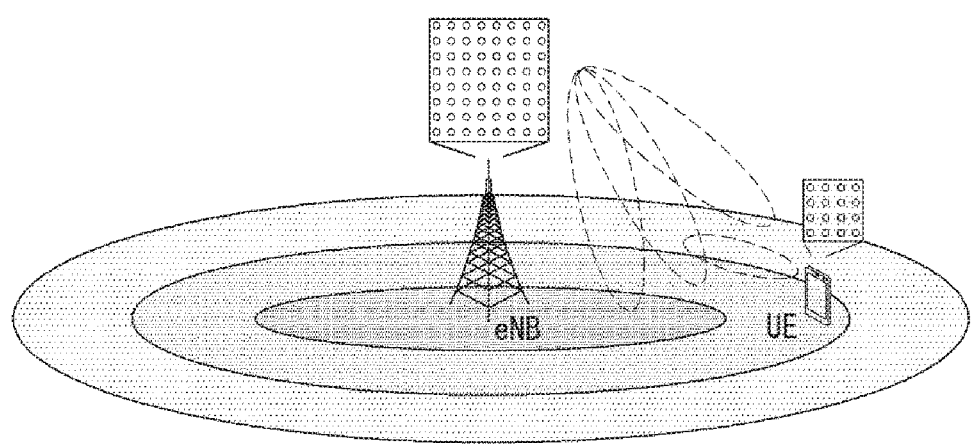
FIG. 11 illustrates a system in which an eNB or UE has a plurality of transmission/reception antennas capable of forming a 3-Dimension (3D) beam based on the AAS in a wireless communication system to which the present invention may be applied.

FIG. 11 illustrates a system in which an eNB or UE has a plurality of transmission/reception antennas capable of forming a 3D beam based on the AAS in a wireless communication system to which the present invention may be applied.

FIG. 11 is a diagram of the aforementioned example and illustrates a 3D MIMO system using a 2D antenna array (i.e., 2D-AAS).

From the point of view of a transmission antenna, if a 3D beam pattern is used, a semi-static or dynamic beam can be formed in the vertical direction of the beam in addition to the horizontal direction. For example, an application, such as the formation of a sector in the vertical direction, may be considered.

Furthermore, from the point of view of a reception antenna, when a reception beam is formed using a massive reception antenna, a signal power rise effect according to an antenna array gain may be expected. Accordingly, in the case of the uplink, an eNB can receive a signal from a UE through a plurality of antennas. In this case, there is an advantage in that the UE can set its transmission power very low by considering the gain of the massive reception antenna in order to reduce an interference influence.

Figure 12:
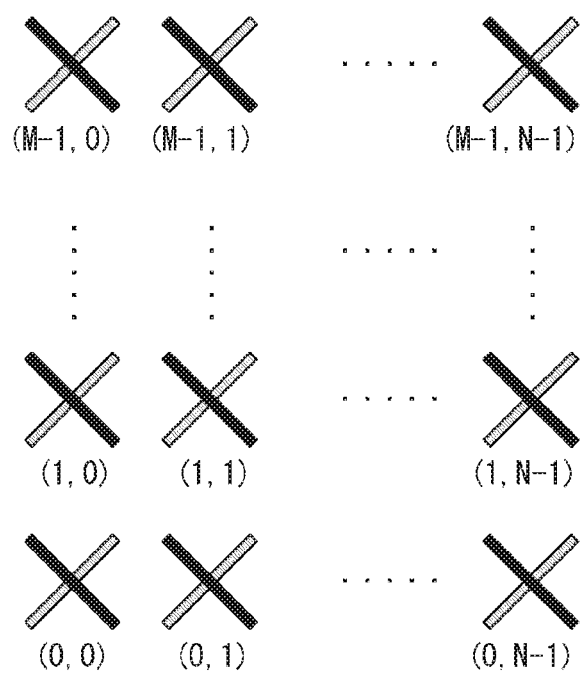
FIG. 12 illustrates a 2D antenna system having cross-polarizations in a wireless communication system to which the present invention may be applied.

FIG. 12 illustrates a 2D antenna system having cross-polarizations in a wireless communication system to which the present invention may be applied.

A 2D planar antenna array model in which polarization is considered may be diagrammed as shown in FIG. 12.

Unlike the existing MIMO system according to a passive antenna, a system based on an active antenna can dynamically control the gain of an antenna element by applying weight to an active element (e.g., an amplifier) to which each antenna element has been attached (or included). The antenna system may be modeled in an antenna element level because a radiation pattern depends on the number of antenna elements and an antenna arrangement, such as antenna spacing.

An antenna array model, such as the example of FIG. 12, may be represented by (M, N, P). This corresponds to a parameter that characterizes an antenna array structure.

M indicates the number of antenna elements having the same polarization in each column (i.e., the vertical direction) (i.e., the number of antenna elements having a +45° slant in each column or the number of antenna elements having a −45° slant in each column).

N indicates the number of columns in the horizontal direction (i.e., the number of antenna elements in the horizontal direction).

P indicates the number of dimensions of polarization. P=2 in the case of cross-polarization as in the case of FIG. 12, or P=1 in the case of co-polarization.

An antenna port may be mapped to a physical antenna element. The antenna port may be defined by a reference signal related to a corresponding antenna port. For example, in the LTE system, the antenna port 0 may be related to a cell-specific reference signal (CRS), and the antenna port 6 may be related to a positioning reference signal (PRS).

For example, an antenna port and a physical antenna element may be mapped in a one-to-one manner. This may correspond to a case where a single cross-polarization antenna element is used for downlink MIMO or downlink transmit diversity. For example, the antenna port 0 is mapped to one physical antenna element, whereas the antenna port 1 may be mapped to the other physical antenna element. In this case, from the point of view of a UE, two types of downlink transmission are present. One is related to a reference signal for the antenna port 0, and the other is related to a reference signal for the antenna port 1.

For another example, a single antenna port may be mapped to multiple physical antenna elements. This may correspond to a case where a single antenna port is used for beamforming. In beamforming, multiple physical antenna elements are used, so downlink transmission may be directed toward a specific UE. In general, this may be achieved using an antenna array configured using multiple columns of multiple cross-polarization antenna elements. In this case, from the point of view of a UE, one type of downlink transmission generated from a single antenna port is present. One is related to a CRS for the antenna port 0, and the other is related to a CRS for the antenna port 1.

That is, an antenna port indicates downlink transmission from the point of view of a UE not actual downlink transmission from a physical antenna element by an eNB.

For another example, a plurality of antenna ports is used for downlink transmission, but each antenna port may be mapped to multiple physical antenna elements. This may correspond to a case where an antenna array is used for downlink MIMO or downlink diversity. For example, each of the antenna ports 0 and 1 may be mapped to multiple physical antenna elements. In this case, from the point of view of a UE, two types of downlink transmission. One is related to a reference signal for the antenna port 0, and the other is related to a reference signal for the antenna port 1.

In FD-MIMO, the MIMO precoding of a data stream may experience antenna port virtualization, transceiver unit (or a transmission and reception unit) (TXRU) virtualization, and an antenna element pattern.

In the antenna port virtualization, a stream on an antenna port is precoded on a TXRU. In the TXRU virtualization, a TXRU signal is precoded on an antenna element. In the antenna element pattern, a signal radiated by an antenna element may have a directional gain pattern.

In the existing transceiver modeling, a static one-to-one mapping between an antenna port and a TXRU is assumed, and a TXRU virtualization effect is joined into a static (TXRU) antenna pattern including the effects of the TXRU virtualization and the antenna element pattern.

The antenna port virtualization may be performed by a frequency-selective method. In LTE, an antenna port, together with a reference signal (or pilot), is defined. For example, for precoded data transmission on an antenna port, a DMRS is transmitted in the same bandwidth as a data signal, and both the DMRS and data are precoded by the same precoder (or the same TXRU virtualization precoding). For CSI measurement, a CSI-RS is transmitted through multiple antenna ports. In CSI-RS transmission, a precoder that characterizes mapping between a CSI-RS port and a TXRU may be designed in a unique matrix so that a UE can estimate a TXRU virtualization precoding matrix for a data precoding vector.

A TXRU virtualization method is discussed in 1D TXRU virtualization and 2D TXRU virtualization, which are described below with reference to the following drawing.

Figure 13:
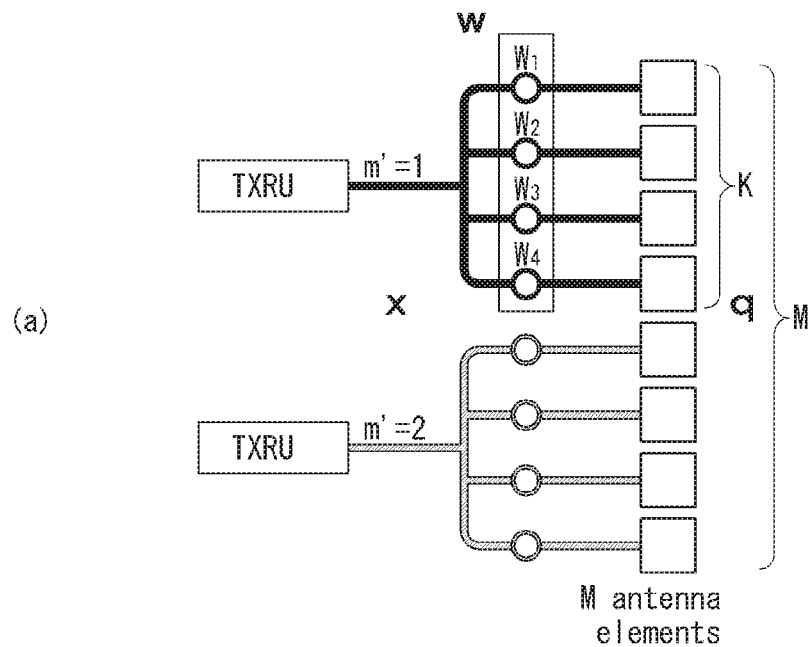
FIG. 13 illustrates a transceiver unit model in a wireless communication system to which the present invention may be applied.
Figure 13:
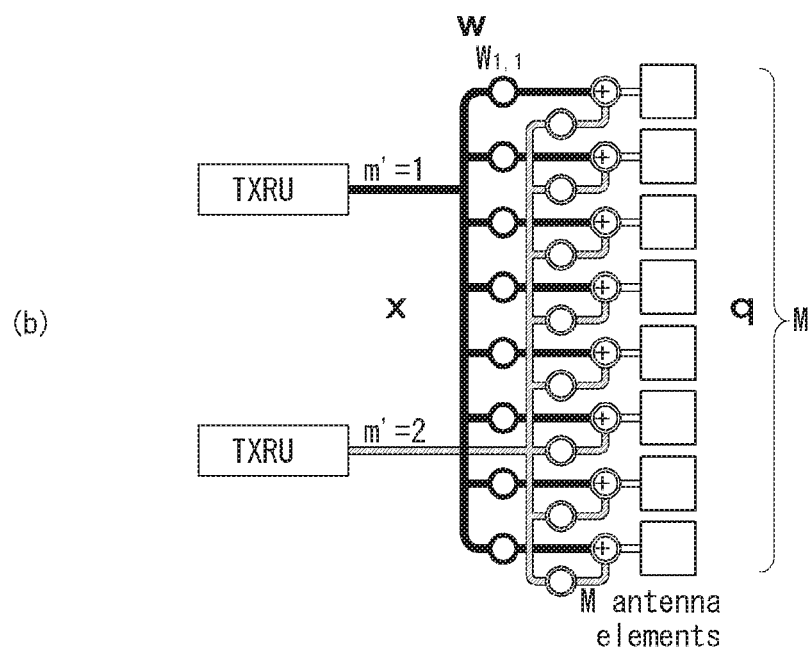

FIG. 13 illustrates a transceiver unit model in a wireless communication system to which the present invention may be applied.

In the 1D TXRU virtualization, M_TXRU TXRUs are related to M antenna elements configured in a single column antenna array having the same polarization.

In the 2D TXRU virtualization, a TXRU model configuration corresponding to the antenna array model configuration (M, N, P) of FIG. 12 may be represented by (M_TXRU, N, P). In this case, M_TXRU means the number of TXRUs present in the 2D same column and same polarization, and always satisfies M_TXRU≤M. That is, the total number of TXRUs is the same as M_TXRU×N×P.

A TXRU virtualization model may be divided into a TXRU virtualization model option-1: sub-array partition model as in FIG. 13(a) and a TXRU virtualization model option-2: full connection model as in FIG. 13(b) depending on a correlation between an antenna element and a TXRU.

Referring to FIG. 13(a), in the case of the sub-array partition model, an antenna element is partitioned into multiple antenna element groups, and each TXRU is connected to one of the groups.

Referring to FIG. 13(b), in the case of the full-connection model, the signals of multiple TXRUs are combined and transferred to a single antenna element (or the arrangement of antenna elements).

In FIG. 13, q is the transmission signal vectors of antenna elements having M co-polarizations within one column. W is a wideband TXRU virtualization vector, and W is a wideband TXRU virtualization matrix. X is the signal vectors of M_TXRU TXRUs.

In this case, mapping between an antenna port and TXRUs may be one-to-one or one-to-many.

In FIG. 13, mapping between a TXRU and an antenna element (TXRU-to-element mapping) shows one example, but the present invention is not limited thereto. From the point of view of hardware, the present invention may be identically applied to mapping between an TXRU and an antenna element which may be implemented in various forms.

Definition of Precoding Matrix Indicator (PMI)

For transmission modes 4, 5, and 6, precoding feedback is used for channel-dependent codebook-based precoding and depends on the UE(s) reporting the PMI. For transmission mode 8, the UE reports the PMI. For transmission modes 9 and 10, the UE reports the PMI if the PMI/RI reporting is configured and the CSI-RS port is greater than one. The UE reports the PMI based on the feedback mode. For other transmission modes, PMI reporting is not supported.

For two antenna ports, each PMI value corresponds to Table 6 and the codebook index below.

When two antenna ports are {0, 1} or {15, 16} and a related RI value is 1, the PMI value corresponds to codebook index n when $\upsilon=1$ in Table 6 below (n∈{0, 1, 2, 3})

When two antenna ports are {0, 1} or {15, 16} and the related RI value is 2, the PMI value corresponds to codebook index n+1 when $\upsilon=2$ in Table 6 below (n∈{0, 1})

Table 6 illustrates codebooks for transmission on antenna port {0, 1} and for CSI reporting based on antenna port {0, 1} or {15, 16}.

TABLE 6

| Codebook Index | Number ($\upsilon$) of layers | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

If four antenna ports are {0, 1, 2, 3} or {15, 16, 17, 18}, each PMI value corresponds to the codebook index given in Table 7 below as follows or corresponds to a pair of codebook indexes given in Tables 8 to 11 below.

The PMI value may correspond to codebook index n given in Table 7 below with respect to the same $\upsilon$ as the related RI value (n∈{0, 1, . . . , 15})

Alternatively, each PMI value may correspond to a pair of codebook indexes given in Tables 8 to 11. Here, in Table 8 and Table 11, $\varphi_n$, $\varphi'_n$, and $v'_m$ are shown in Equation 15 below.

$$\varphi_n = e^{j\pi n/2}$$

$$\varphi'_n = e^{j2\pi n/32}$$

$$v'_m = [1\, e^{j2\pi n/32}]^T \qquad \text{[Equation 15]}$$

The first PMI value ($i_1 \in \{0, 1, \ldots, f(\upsilon)-1\}$) and the second PMI value ($i_2 \in \{0, 1, \ldots, g(\upsilon)-1\}$) correspond to the codebook indexes $i_1$ and $i_2$ given in Table j, respectively for the same as the related RI value. Here, for each of $\upsilon=\{1, 2, 3, 4\} f(\upsilon)=\{16, 16, 1, 1\}$, and $g(\upsilon)=\{16, 16, 16, 16\}$, j corresponds to 8, 9, 10, and 11.

In Tables 10 and 11, $W_n^{\{s\}}$ represents a matrix defined by columns given by set {s} from $W_n = I - 2u_n u_n^H/u_n^H u_n$. Here, I represents 4×4 unit matrix and vector $u_n$ is determined in Table 7. In addition, $n_i = i_2$.

In some cases, codebook subsampling is supported.

Table 7 illustrates codebooks for transmission on antenna port {0, 1, 2, 3} and for CSI reporting based on antenna port {0, 1, 2, 3} or {15, 16, 17, 18}.

TABLE 7

| Codebook Index | $u_n$ | Number of layers ($\upsilon$) | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |

TABLE 7-continued

| Codebook Index | $u_n$ | Number of layers ($v$) | | | |
|---|---|---|---|---|---|
| | | 1 | 2 | 3 | 4 |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Table 8 illustrates a codebook for 1 layer CSI reporting using antenna ports 0 to 3 or 15 to 18.

TABLE 8

| $i_1$ | $i_2$ | | | | | | | |
|---|---|---|---|---|---|---|---|---|
| | 0 | 1 | 2 | 3 | 4 | 5 | 6 | 7 |
| 0-15 | $W_{i_1,0}^{(1)}$ | $W_{i_1,8}^{(1)}$ | $W_{i_1,16}^{(1)}$ | $W_{i_1,24}^{(1)}$ | $W_{i_1+8,2}^{(1)}$ | $W_{i_1+8,10}^{(1)}$ | $W_{i_1+8,18}^{(1)}$ | $W_{i_1+8,26}^{(1)}$ |

| $i_1$ | $i_2$ | | | | | | | |
|---|---|---|---|---|---|---|---|---|
| | 8 | 9 | 10 | 11 | 12 | 13 | 14 | 15 |
| 0-15 | $W_{i_1+16,4}^{(1)}$ | $W_{i_1+16,12}^{(1)}$ | $W_{i_1+16,20}^{(1)}$ | $W_{i_1+16,28}^{(1)}$ | $W_{i_1+24,6}^{(1)}$ | $W_{i_1+24,14}^{(1)}$ | $W_{i_1+24,22}^{(1)}$ | $W_{i_1+24,30}^{(1)}$ |

$$W_{m,n}^{(1)} = \frac{1}{2}\begin{bmatrix} v'_m \\ \varphi'_n v'_m \end{bmatrix}$$

Table 9 illustrates a codebook for 2 layer CSI reporting using antenna ports 0 to 3 or 15 to 18.

TABLE 9

| $i_1$ | $i_2$ | | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

| $i_1$ | $i_2$ | | | |
|---|---|---|---|---|
| | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| $i_1$ | $i_2$ | | | |
|---|---|---|---|---|
| | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |

| $i_1$ | $i_2$ | | | |
|---|---|---|---|---|
| | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

$$W_{m,m',n}^{(2)} = \frac{1}{\sqrt{8}}\begin{bmatrix} v'_m & v'_{m'} \\ \varphi_2 v'_m & -\varphi_2 v'_{m'} \end{bmatrix}$$

Table 10 illustrates a codebook for 3 layer CSI reporting using antenna ports 15 to 18.

TABLE 10

| $i_1$ | $i_2$ | | | | | | | |
|---|---|---|---|---|---|---|---|---|
| | 0 | 1 | 2 | 3 | 4 | 5 | 6 | 7 |
| 0 | $W_0^{\{124\}}/\sqrt{3}$ | $W_1^{\{123\}}/\sqrt{3}$ | $W_2^{\{123\}}/\sqrt{3}$ | $W_3^{\{123\}}/\sqrt{3}$ | $W_4^{\{124\}}/\sqrt{3}$ | $W_5^{\{124\}}/\sqrt{3}$ | $W_6^{\{134\}}/\sqrt{3}$ | $W_7^{\{134\}}/\sqrt{3}$ |

| $i_1$ | $i_2$ | | | | | | | |
|---|---|---|---|---|---|---|---|---|
| | 8 | 9 | 10 | 11 | 12 | 13 | 14 | 15 |
| 0 | $W_8^{\{124\}}/\sqrt{3}$ | $W_9^{\{134\}}/\sqrt{3}$ | $W_{10}^{\{123\}}/\sqrt{3}$ | $W_{11}^{\{134\}}/\sqrt{3}$ | $W_{12}^{\{123\}}/\sqrt{3}$ | $W_{13}^{\{123\}}/\sqrt{3}$ | $W_{14}^{\{123\}}/\sqrt{3}$ | $W_{15}^{\{123\}}/\sqrt{3}$ |

Table 11 illustrates a codebook for 4 layer CSI reporting using antenna ports 15 to 18.

TABLE 11

| $i_1$ | $i_2$ | | | | | | | |
|---|---|---|---|---|---|---|---|---|
| | 0 | 1 | 2 | 3 | 4 | 5 | 6 | 7 |
| 0 | $W_0^{\{1234\}}/2$ | $W_1^{\{1234\}}/2$ | $W_2^{\{3214\}}/2$ | $W_3^{\{3214\}}/2$ | $W_4^{\{1234\}}/2$ | $W_5^{\{1234\}}/2$ | $W_6^{\{1324\}}/2$ | $W_7^{\{1324\}}/2$ |

| $i_1$ | $i_2$ | | | | | | | |
|---|---|---|---|---|---|---|---|---|
| | 8 | 9 | 10 | 11 | 12 | 13 | 14 | 15 |
| 0 | $W_8^{\{1234\}}/2$ | $W_9^{\{1234\}}/2$ | $W_{10}^{\{1324\}}/2$ | $W_{11}^{\{1324\}}/2$ | $W_{12}^{\{1234\}}/2$ | $W_{13}^{\{1324\}}/2$ | $W_{14}^{\{3214\}}/2$ | $W_{15}^{\{1234\}}/2$ |

In the case of 8 antenna ports, each PMI value corresponds to a pair of codebook indexes given in Tables 12 to 19 below. Here, $\varphi_n$ and $v_m$ are shown in Equation 16 below.

$$\varphi_n = e^{j\pi n/2}$$

$$v_m = [1\ e^{j2\pi m/32}\ e^{j4\pi m/32}\ e^{j6\pi m/32}]^T \quad \text{[Equation 16]}$$

In the case of 8 antenna ports {15, 16, 17, 18, 19, 20, 21, 22} the first PMI value ($i_1 \in \{0, 1, \ldots, f(\upsilon)-1\}$) and the second PMI value ($i_2 \in \{0, 1, \ldots, g(\upsilon)-1\}$) correspond to codebook indexes $i_1$ and $i_2$ given in Table j with respect to the same $\upsilon$ as the related RI value, respectively. Here, j=$\upsilon$, $f(\upsilon)=\{16, 16, 4, 4, 4, 4, 4, 1\}$, and $g(\upsilon)=\{16, 16, 16, 8, 1, 1, 1, 1\}$.

In some cases, the codebook subsampling is supported.

Table 12 illustrates a codebook for 1 layer CSI reporting using antenna ports 15 to 22.

TABLE 12

| $i_1$ | $i_2$ | | | | | | | |
|---|---|---|---|---|---|---|---|---|
| | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| $i_1$ | $i_2$ | | | | | | | |
|---|---|---|---|---|---|---|---|---|
| | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ |

$$W_{m,n}^{(1)} = \frac{1}{\sqrt{8}} \begin{bmatrix} v_m \\ \varphi_n v_m \end{bmatrix}$$

Table 13 illustrates a codebook for 2 layer CSI reporting using antenna ports 15 to 22.

TABLE 13

| | $i_2$ | | | |
|---|---|---|---|---|
| $i_1$ | 0 | 1 | 2 | 3 |
| 0-15 | $W^{(2)}_{2i_1,2i_1,0}$ | $W^{(2)}_{2i_1,2i_1,1}$ | $W^{(2)}_{2i_1+1,2i_1,0}$ | $W^{(2)}_{2i_1+1,2i_1+1,1}$ |

| | $i_2$ | | | |
|---|---|---|---|---|
| $i_1$ | 4 | 5 | 6 | 7 |
| 0-15 | $W^{(2)}_{2i_1+2,2i_1+2,0}$ | $W^{(2)}_{2i_1+2,2i_1+2,1}$ | $W^{(2)}_{2i_1+3,2i_1+3,0}$ | $W^{(2)}_{2i_1+3,2i_1+3,1}$ |

| | $i_2$ | | | |
|---|---|---|---|---|
| $i_1$ | 8 | 9 | 10 | 11 |
| 0-15 | $W^{(2)}_{2i_1,2i_1+1,0}$ | $W^{(2)}_{2i_1,2i_1+1,1}$ | $W^{(2)}_{2i_1+1,2i_1+2,0}$ | $W^{(2)}_{2i_1+1,2i_1+2,1}$ |

| | $i_2$ | | | |
|---|---|---|---|---|
| $i_1$ | 12 | 13 | 14 | 15 |
| 0-15 | $W^{(2)}_{2i_1,2i_1+3,0}$ | $W^{(2)}_{2i_1,2i_1+3,1}$ | $W^{(2)}_{2i_1+1,2i_1+3,0}$ | $W^{(2)}_{2i_1+1,2i_1+3,1}$ |

$$W^{(2)}_{m,m',n} = \frac{1}{4}\begin{bmatrix} v_m & v_{m'} \\ \varphi_n v_m & -\varphi_n v_{m'} \end{bmatrix}$$

Table 14 illustrates a codebook for 3 layer CSI reporting using antenna ports 15 to 22.

TABLE 14

| | $i_2$ | | | |
|---|---|---|---|---|
| $i_1$ | 0 | 1 | 2 | 3 |
| 0-3 | $W^{(3)}_{8i_1,8i_1,8i_1+8}$ | $W^{(3)}_{8i_1+8,8i_1,8i_1+8}$ | $\tilde{W}^{(3)}_{8i_1,8i_1+8,8i_1+8}$ | $\tilde{W}^{(3)}_{8i_1+8,8i_1,8i_1}$ |

| | $i_2$ | | | |
|---|---|---|---|---|
| $i_1$ | 4 | 5 | 6 | 7 |
| 0-3 | $W^{(3)}_{8i_1+2,8i_1+2,8i_1+10}$ | $W^{(3)}_{8i_1+10,8i_1+2,8i_1+10}$ | $\tilde{W}^{(3)}_{8i_1+2,8i_1+10,8i_1+10}$ | $\tilde{W}^{(3)}_{8i_1+10,8i_1+2,8i_1+2}$ |

| | $i_2$ | | | |
|---|---|---|---|---|
| $i_1$ | 8 | 9 | 10 | 11 |
| 0-3 | $W^{(3)}_{8i_1+4,8i_1+4,8i_1+12}$ | $W^{(3)}_{8i_1+12,8i_1+4,8i_1+12}$ | $\tilde{W}^{(3)}_{8i_1+4,8i_1+12,8i_1+12}$ | $\tilde{W}^{(3)}_{8i_1+12,8i_1+4,8i_1+4}$ |

| | $i_2$ | | | |
|---|---|---|---|---|
| $i_1$ | 12 | 13 | 14 | 15 |
| 0-3 | $W^{(3)}_{8i_1+6,8i_1+6,8i_1+14}$ | $W^{(3)}_{8i_1+14,8i_1+6,8i_1+14}$ | $\tilde{W}^{(3)}_{8i_1+6,8i_1+14,8i_1+14}$ | $\tilde{W}^{(3)}_{8i_1+14,8i_1+6,8i_1+6}$ |

$$W^{(3)}_{m,m',m''} = \frac{1}{\sqrt{24}}\begin{bmatrix} v_m & v_{m'} & v_{m''} \\ v_m & -v_{m'} & -v_{m''} \end{bmatrix},$$

$$\tilde{W}^{(3)}_{m,m',m''} = \frac{1}{\sqrt{24}}\begin{bmatrix} v_m & v_{m'} & v_{m''} \\ v_m & -v_{m'} & -v_{m''} \end{bmatrix},$$

Table 15 illustrates a codebook for 4 layer CSI reporting using antenna ports 15 to 22.

TABLE 15

| $i_1$ | $i_2$ | | | |
|---|---|---|---|---|
| | 0 | 1 | 2 | 3 |
| 0-3 | $W_{8i_1,8i_1+8,0}^{(4)}$ | $W_{8i_1,8i_1+8,1}^{(4)}$ | $W_{8i_1+2,8i_1+10,0}^{(4)}$ | $W_{8i_1+2,8i_1+10,1}^{(4)}$ |

| $i_1$ | $i_2$ | | | |
|---|---|---|---|---|
| | 4 | 5 | 6 | 7 |
| 0-3 | $W_{8i_1+4,8i_1+12,0}^{(4)}$ | $W_{8i_1+4,8i_1+12,1}^{(4)}$ | $W_{8i_1+6,8i_1+14,0}^{(4)}$ | $W_{8i_1+6,8i_1+14,1}^{(4)}$ |

$$W_{m,m',n}^{(4)} = \frac{1}{\sqrt{32}} \begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$$

Table 16 illustrates a codebook for 5 layer CSI reporting using antenna ports 15 to 22.

TABLE 16

| $i_1$ | $i_2$ |
|---|---|
| | 0 |
| 0-3 | $W_{i_1}^{(5)} = \frac{1}{\sqrt{40}} \begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

Table 17 illustrates a codebook for 6 layer CSI reporting using antenna ports 15 to 22.

TABLE 17

| $i_1$ | $i_2$ |
|---|---|
| | 0 |
| 0-3 | $W_{i_1}^{(6)} = \frac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

Table 18 illustrates a codebook for 7 layer CSI reporting using antenna ports 15 to 22.

TABLE 18

| $i_1$ | $i_2$ |
|---|---|
| | 0 |
| 0-3 | $W_{i_1}^{(7)} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

Table 19 illustrates a codebook for 8 layer CSI reporting using antenna ports 15 to 22.

TABLE 19

| $i_1$ | $i_2$ |
|---|---|
| | 0 |
| 0 | $W_{i_1}^{(8)} = \frac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

Hybrid CSI Reporting Method and Codebook Configuration Method for the Same

With the introduction of FD (Full Dimension)-MIMO (or may be referred to as Massive-MIMO, enhanced-MIMO, Large-Scale Antenna System, Very Large MIMO, Hyper-MIMO, etc.), the base station can increase throughput of a system by performing D-beamforming, etc. using N (N>>1) antenna ports (or may correspond to "element" according to specific port-to-element virtualization and hereinafter are referred to as "port" for convenience of explanation).

In current 3GPP Rel-13, there are defined a CSI-RS operation (or CSI reporting operation) of a non-precoded scheme defined as Class A (each CSI process may be associated with one CSI-RS resource and one CSI-IM resource) and a CSI-RS operation (or CSI reporting operation) of a beamformed scheme defined as Class B (each CSI process may be associated with one or more CSI-RS resources and one or more CSI-IM resources).

In the case of Class A, the UE measures N antenna ports, selects an N-port precoder using the N antenna ports, and reports CSI (PMI, CQI, RI, etc.) related to the N-port precoder to the base station. However, as N increases, a CSI-RS for channel measurement of the UE also has to increase, and a size of a codebook related to this increases, thereby resulting in an increase in a feedback overhead.

On the other hand, in the case of Class B, the number of CSI-RS ports is related to a maximum rank of the UE rather than the number of antenna ports of the base station. Therefore, there is an advantage that the Class B can be used without a large increase in the CSI-RS even if the number of antenna ports of the base station increases. However, because the beam selection has to be carried out at the base station, there is a disadvantage that robustness of beamforming may be weakened in an environment where mobility of the UE is high and a beam of the base station is narrow.

To overcome drawbacks of these two schemes, a hybrid CSI-RS based scheme (or CSI reporting scheme) used by combining the Class A and the Class B may be considered.

As described above, a combination of two (or more) processes for CSI reporting in a single CSI process configuration may be referred to as "hybrid CSI". That is, the hybrid CSI may mean a CSI reporting type including two (or more) CSI-RS configurations in a single CSI process.

In this case, a type of each CSI-RS configuration may be configured as one of the Class A and the Class B described above. For example, if RRC parameter 'eMIMO-Type' for a corresponding CSI-RS configuration is set to 'non-precoded', the CSI-RS configuration may correspond to a CSI-RS configuration of Class A. If the RRC parameter 'eMIMO-Type' is set to 'beamformed', the CSI-RS configuration may correspond to a CSI-RS configuration of Class B.

That is, two CSI-RS configurations in the single CSI process may include a first CSI-RS configuration and a second CSI-RS configuration.

Figure 14:
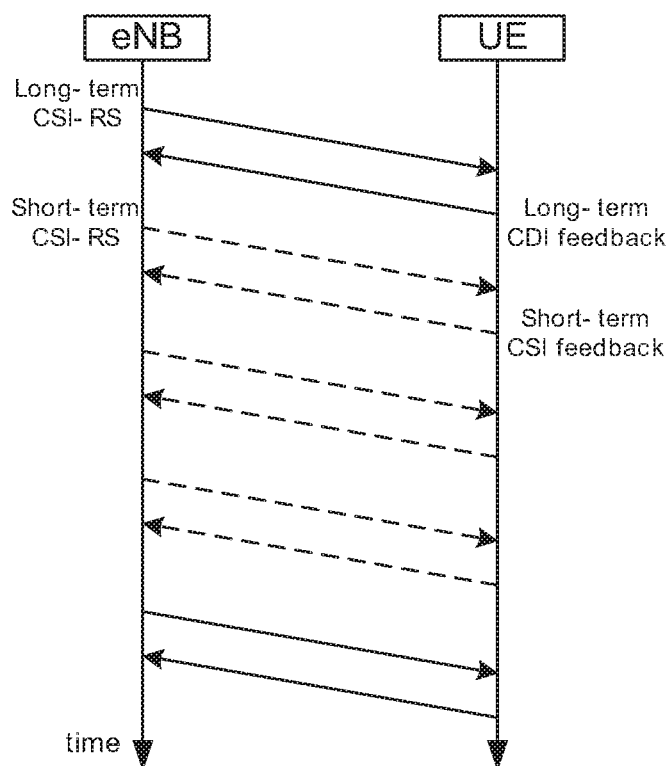
FIG. 14 illustrates a hybrid CSI-RS based scheme in a wireless communication system to which the present invention is applicable.

FIG. 14 illustrates a hybrid CSI-RS based scheme in a wireless communication system to which the present invention is applicable.

In FIG. 14, an example of a hybrid CSI-RS scheme is illustrated. In FIG. 14, a solid line represents a CSI-RS transmission of the base station and a feedback operation of the UE, each of which has a long-term period, and a solid line represents a CSI-RS transmission of the base station and a feedback operation of the UE, each of which has a short-term period (i.e., relatively shorter than a long-term CSI-RS).

The long-term CSI-RS, CSI-RS based on Class A (i.e., the first CSI-RS configuration), is configured for the Class A and is used to measure long-term Channel Direction Information (CDI). The UE may report preferred CDI to the base station using the long-term CSI-RS in consideration of a position and mobility of the UE. Here, the CDI may include integrally or independently information of a horizontal domain and information of a vertical domain.

In case of short-term CSI-RS (i.e., the second CSI-RS configuration), the base station utilizes the CDI obtained in the long-term and configures beamforming specified for the UE. The base station informs the UE of this using the short-term CSI-RS, and the UE can feedback beam selection, co-phasing, RI information, and the like to the short-term.

The present invention proposes a method for configuring a CDI codebook for the hybrid scheme. The present invention proposes a method for configuring a codebook for a CSI reporting for the first CSI-RS configuration included in a single CSI process configured with a hybrid CSI.

The UE may be informed of whether to use the hybrid CSI-RS via higher layer signaling (e.g., RRC signaling).

For example, if Class C (for example, a higher layer parameter 'eMIMO-Type' is set to 'hybrid' or 'Class C') is configured for the UE, the UE may recognize this as a hybrid based scheme and perform an operation of a CSI report, etc.

Since a use of the CDI codebook in the hybrid scheme is to know channel directionality of the UE, a full-port scheme using all of antenna ports of the base station and a partial-port scheme using some antenna ports of the base station may be considered to estimate the channel directionality of the UE.

Hereinafter, in the description of the present invention, unless otherwise stated, terms such as CDI, Beam Index (BI) or CSI-RS Resource Indicator, and PMI may be interpreted as a meaning commonly referring to other terms.

If the first CSI-RS configuration in hybrid CSI is configured for Class A, the base station may transmit a CSI-RS to the UE using multiple antenna ports on one CSI-RS resource, and the UE may select a preferred precoding matrix from a previously defined codebook based on the CSI-RS transmitted from the received CSI-RS resource and may report a PMI (in this case, the PMI may be composed of a first PMI (W1 or i_1) and a second PMI (W2 or i_2)) corresponding to the selected precoding matrix (or RI) to the base station.

If the first CSI-RS configuration in the hybrid CSI is configured for Class B, the first CSI-RS configuration may correspond to Class B CSI-RS configuration having K (>1) CSI-RS resources (i.e., CSI-RS resources to which beamformed CSI-RSs are mapped). Namely, the base station may map a beamformed CSI-RS to each of the K CSI-RS resources and transmit it to the UE, and the UE may select one preferred CSI-RS resource (i.e., beam) among the received K CSI-RS resources (i.e., the K beamformed CSI-RSs) and may report CRI (or CDI, BI) to the base station.

Figure 15:
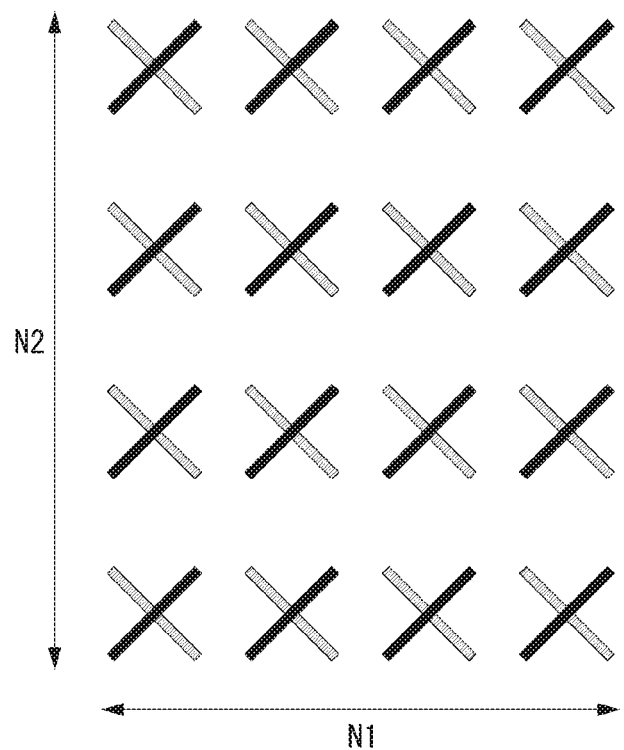
FIG. 15 illustrates a 32-port antenna port layout in a wireless communication system to which the present invention is applicable.

FIG. 15 illustrates a 32-port antenna port layout in a wireless communication system to which the present invention is applicable.

For example, a 1D (1-dimensional) or 2D (2-dimensional) antenna layout including N ports considered in FD-MIMO is considered. FIG. 15 illustrates an example of N=32 (where N1=4, N2=4, and N1 and N2 respectively denote the number of columns and the number of rows (with co-polarization) of an antenna port).

Hereinafter, in the description of the present invention, N1 denotes a horizontal domain and N2 denotes a vertical domain for convenience of explanation, and in some cases, N1 may correspond to a vertical domain and N2 may correspond to a horizontal domain. Further, it is obvious that the 1D layout indicates a case where N2=1 or N1=1.

A. Discrete Fourier Transform (DFT) Based Codebook Corresponding to a 2D Antenna Layout with Cross Polarization May be Used.

1. Reuse of Legacy Dual Codebook Structure

A codebook according to an embodiment of the present invention may be configured as indicated in Equation 17 below.

[Equation 17]

$$W_{m_1,m_2,n} = \frac{1}{\sqrt{2N_1N_2}} \begin{bmatrix} v_{m_1} \otimes u_{m_2} \\ \phi_n v_{m_1} \otimes u_{m_2} \end{bmatrix} \quad (17\text{-}a)$$

$$v_{m_1} = \begin{bmatrix} 1 & e^{j\frac{2\pi m_1}{o_1 N_1}} & \cdots & e^{j\frac{2\pi m_1(N_1-1)}{o_1 N_1}} \end{bmatrix}^t, \quad (17\text{-}b)$$

$$m_1 = 0, 1, \ldots, o_1 N_1 - 1$$

$$u_{m_2} = \begin{bmatrix} 1 & e^{j\frac{2\pi m_2}{o_2 N_2}} & \cdots & e^{j\frac{2\pi m_2(N_2-1)}{o_2 N_2}} \end{bmatrix}^t, \quad (17\text{-}c)$$

$$m_2 = 0, 1, \ldots, o_2 N_2 - 1$$

$$\phi_n = \{1, j, -1, -j\} \quad (17\text{-}d)$$

When a CDI codebook is configured using the above Equation 17, a total size of the codebook may be determined as $LN_1N_2o_1o_2$ where L denotes a size of co-phasing illustrated in (17-d) of Equation 17.

Here, $N_1$, $N_2$, $o_1$, $o_2$ which are port layout information and an oversampling factor may be informed to the UE by the base station via higher layer signaling (e.g., RRC signaling).

As another example, the base station may inform the UE of only information of $N_1$, $N_2$ via the higher layer signaling (e.g., RRC signaling), and fixed $o_1$, $o_2$ (e.g., $o_1$=4, $o_2$=4 or $o_1$=8, $o_2$=8) or $o_1$=1, $o_2$=1 without oversampling may be used. Further, in order to reduce a CDI feedback overhead, {1, j} reduced as indicated in (17-d) of Equation 17 corresponding to co-phasing may be used.

The UE may report a most preferred beam index (BI) (i.e., PMI corresponding to a precoding matrix the UE selects in the codebook) to the base station using the codebook, and the base station may perform beamforming suitable for a beamformed scheme using the reported BI (or CDI).

Namely, the base station may calculate a beamforming coefficient of a beam group using the BI (or CDI) reported from the UE and may transmit the beamformed CSI-RS to the UE using the calculated beamforming coefficient. In other words, a precoding matrix set (group) may be determined by PMI reported by the UE, and the base station may transmit the beamformed CSI-RS to the UE by applying a precoding matrix belonging to the precoding matrix set (group) to each CSI-RS.

2. CDI Codebook for Each of Horizontal Domain and Vertical Domain

Depending on an environment (e.g., indoor, outdoor, UE mobility (i.e., during UE movement), etc.) in which the UE is positioned, there may be a case where a CDI of a horizontal domain mainly changes or a case where a CDI of a vertical domain mainly changes.

In this case, it may be more preferable for the UE to report the CDI for any one domain rather than to jointly measure and report channels of the two domains as in the above-described scheme 1 in terms of feedback overhead.

A codebook according to an embodiment of the present invention may be configured as indicated in Equation 18 or Equation 19 below.

$$W_{m_1,n} = \frac{1}{\sqrt{2N_1}} \begin{bmatrix} v_{m_1} \\ \phi_n v_{m_1} \end{bmatrix}, \quad m_1 = 0, 1, \ldots, Lo_1 N_1 - 1 \quad \text{[Equation 18]}$$

$$W_{m_2,n} = \frac{1}{\sqrt{2N_2}} \begin{bmatrix} u_{m_2} \\ \phi_n u_{m_2} \end{bmatrix}, \quad m_2 = 0, 1, \ldots, Lo_2 N_2 - 1 \quad \text{[Equation 19]}$$

The UE may feedback a CDI index (i.e., PMI corresponding to a precoding matrix the UE selects in the codebook) to the base station according to a long-term report period using a codebook corresponding to a channel, in which a specific channel has changed relatively more than a previous channel in the codebook configured according to Equation 18 or Equation 19, in consideration of UE's surrounding environment (e.g., UE's location, mobility, etc.).

In this case, the UE may use W1 (i.e., a first PMI value i_1) of a legacy codebook (i.e., 3GPP Rel-12 4Tx codebook (for example, see the above Tables 6 to 11) and Rel-10 8Tx codebook (for example, see the above Tables 12 to 19)) with respect to each domain.

Further, the UE may report a codebook suitable for each domain using Equation 18 or Equation 19. At this time, information about each domain (i.e., a domain the UE selects (reports)) may be distinguished using 1-bit indicator.

Alternatively, the UE may combine and jointly report two domains. Namely, the UE may report a CDI index for each domain.

The base station may calculate a beamforming coefficient of a beam group using the BI (or CDI) reported from the UE and may transmit the beamformed CSI-RS to the UE using the calculated beamforming coefficient. In other words, a precoding matrix set (group) may be determined by the PMI reported by the UE, and the base station may transmit the beamformed CSI-RS to the UE by applying a precoding matrix belonging to the precoding matrix set (group) to each CSI-RS.

3. CDI Codebook without Co-Phasing

An example of using a CDI codebook without co-phasing may use codebook configuration (i.e., when a higher layer parameter 'PMI-Config' is set to 1 or 'W2alternativeCodebookEnabledCLASSB_K1' is set to 'TRUE') for Class B CSI reporting using W2-only feedback of only W2 (i.e., a second PMI value i_2) defined in Rel-13.

Because W2 is composed of beam selection and co-phasing, the co-phasing need not be considered in the CDI codebook when the A-3 scheme is used.

In this case, a CDI codebook based on the above-described A-1 scheme is shown in Equation 20 below.

$$W_{m_1,m_2,n} = \frac{1}{\sqrt{N_1 N_2}} [v_{m_1} \otimes u_{m_2}] \quad \text{[Equation 20]}$$

Similar to this, a CDI codebook based on the above-described A-2 scheme is shown in Equation 21 and Equation 22 below.

$$W_{m_1,n} = \frac{1}{\sqrt{N_1}} v_{m_1}, \quad m_1 = 0, 1, \ldots, o_1 N_1 - 1 \quad \text{[Equation 21]}$$

$$W_{m_2,n} = \frac{1}{\sqrt{N_2}} u_{m_2}, \quad m_2 = 0, 1, \ldots, o_2 N_2 - 1 \quad \text{[Equation 22]}$$

When the base station configures beamforming using the codebook, a beam group configured with beamforming will be described with reference to the following drawing.

Figure 16:
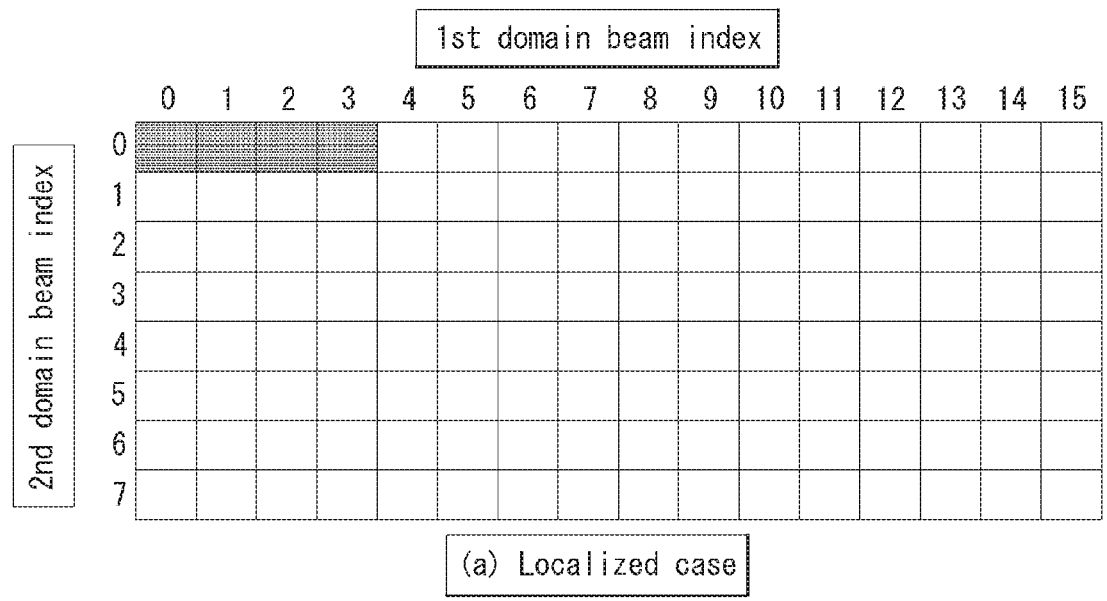
FIGS. 16 to 18 illustrate a 2D beam group according to an embodiment of the present invention.
Figure 16:
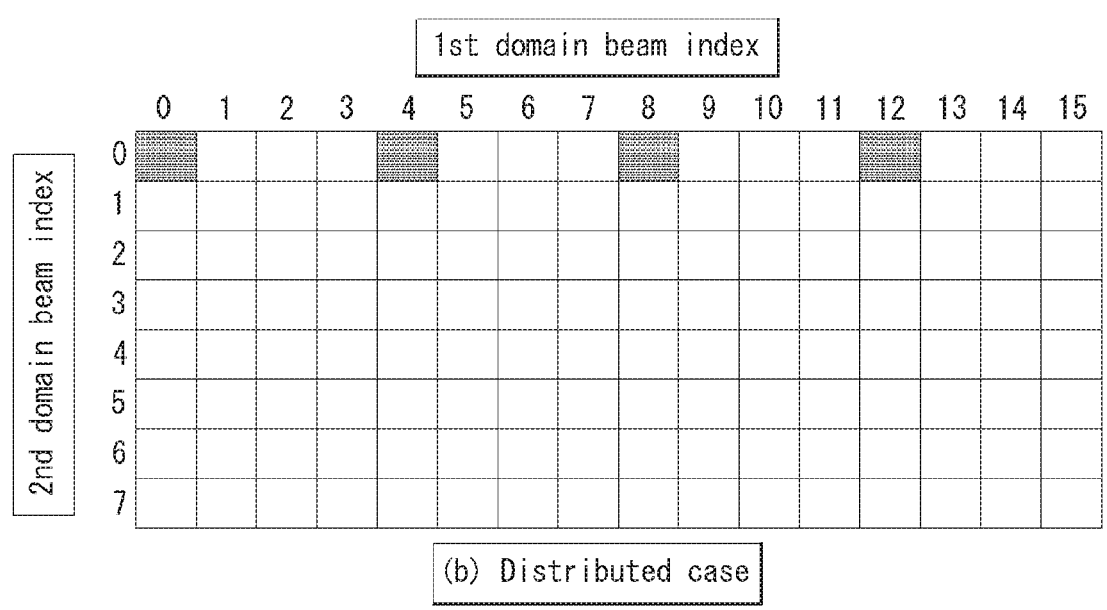

FIG. 16 illustrates a 2D beam group according to an embodiment of the present invention.

In FIG. 16, when $(N_1, N_2, o_1, o_2)=(4, 2, 4, 4)$, a localized case and a distributed case of a 2D beam group are illustrated.

Beam groups configured with beamforming using a codebook configured according to the above Equation 21 or Equation 22 may be grouped into a localized beam or a distributed beam as illustrated in FIG. 16. Namely, the base station may use a localized beam group or a distributed beam group illustrated in FIG. 16 when transmitting a beamformed CSI-RS to the UE.

The localized beam group is advantageous when the angular spread is small, and the distributed beam group is advantageous when the angular spread is large.

Accordingly, the UE can integrally or independently report codebook configuration information to the base station together with CDI so that the UE can measure the channel and obtain setting of a beam group advantageous for the UE. More specifically, the UE can previously agree with the base station about localized and distributed codebooks and can integrally or independently report information indicating one of the previously agreed localized and distributed codebooks together with CDI.

Alternatively, the UE can integrally or independently report distributed information of beams of a given beam group (e.g., information on beam spacing (p1, p2) of a beam group, wherein the beam spacing information may be represented as (1st domain beam spacing, 2nd domain beam spacing), or may be represented as an index after indexing is previously assigned to each of (1st domain beam spacing, 2nd domain beam spacing)) to the base station together with CDI.

Further, the above scheme may be applied even when Rel-13 codebook (i.e., codebook for W2-only feedback of only W2 (i.e., the second PMI value i_2)) is used.

Alternatively, when a codebook for W2-only feedback of only W2 (i.e., the second PMI value i_2) defined in Rel-13 is used in short-term reporting, the UE may report UE's preferred Pmi-Config among four Pmi-Config to the base station.

The base station may calculate a beamforming coefficient of a beam group using CDI (i.e., PMI corresponding to a precoding matrix the UE selects in the codebook) reported from the UE and may transmit the beamformed CSI-RS to the UE using the calculated beamforming coefficient. In other words, configuration of the codebook may be determined by codebook configuration information reported by the UE, a precoding matrix set (group) corresponding to the corresponding codebook configuration may be determined by the PMI reported by the UE, and the base station may transmit the beamformed CSI-RS to the UE by applying a precoding matrix belonging to the precoding matrix set (group) to each CSI-RS.

Figure 17:
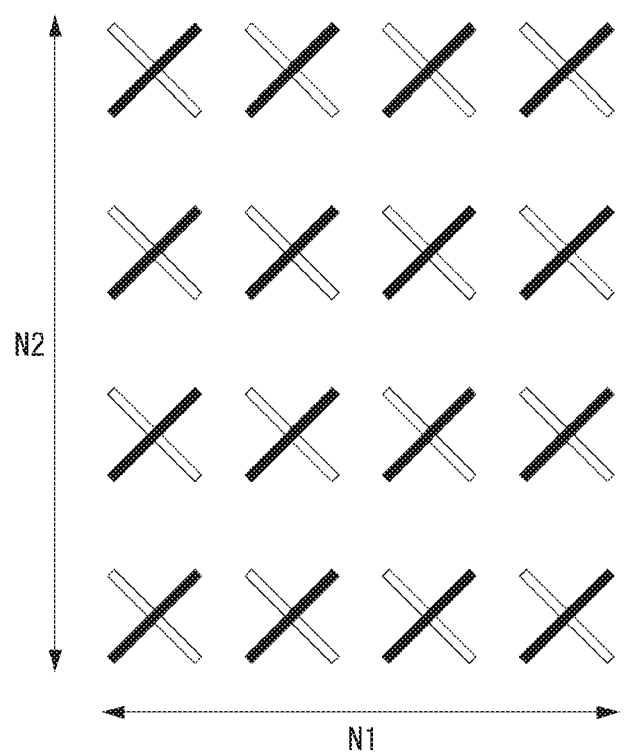

FIG. 17 illustrates a 2D beam group according to an embodiment of the present invention.

FIG. 17 illustrates an example where only one polarization (i.e., slant, "/" in FIG. 17) is used in an antenna port layout of 32-port.

As illustrated in FIG. 17, it may be assumed that a case of the above A-3 scheme is effectively the same as a case where one slant is used in a cross polarization antenna. Thus, the base station may transmit a CSI-RS to the UE using only antenna ports with co-polarization for the CDI measurement at the UE.

A proposed method may also be applied to an antenna port environment with co-polarization.

4. Partial Port CDI Feedback

The base station may transmit a CSI-RS using some antenna ports for the CDI measurement in all of antenna ports, and the UE may report CDI (i.e., PMI corresponding to a precoding matrix the UE selects in a codebook) from a codebook corresponding to some antenna ports, to which the CSI-RS is transmitted, to the base station.

Figure 18:
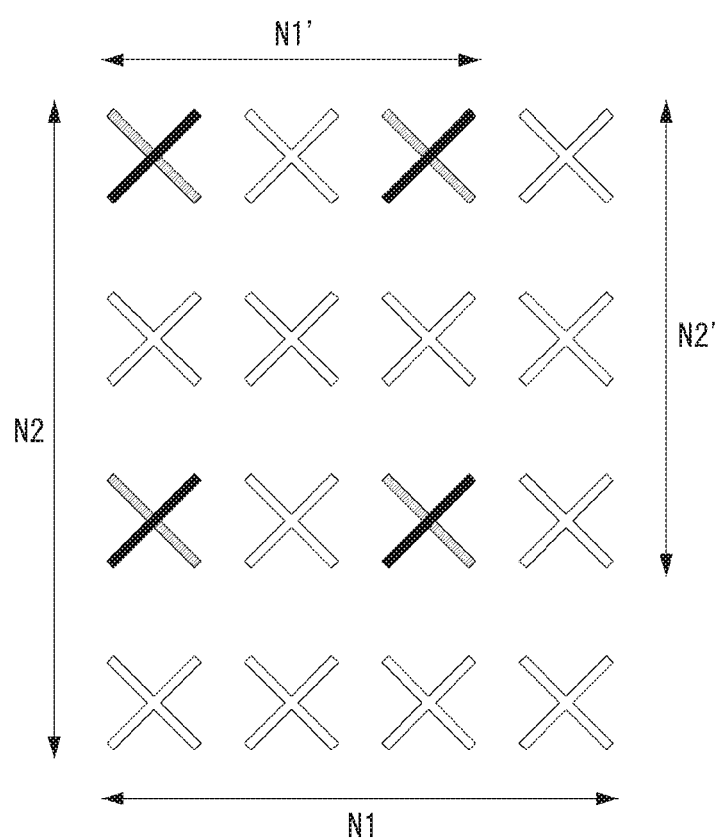

FIG. 18 illustrates a 2D beam group according to an embodiment of the present invention.

FIG. 18 illustrates an example where a partial port is used for the CDI measurement.

In FIG. 18, N1' and N2' respectively denote the number of columns and the number of rows of an antenna port actually used for the CDI measurement. This may be configured for the UE via additional (or separate) higher layer signaling (e.g., RRC signaling).

Further, since there is the case where one polarization is used as illustrated in FIG. 17, a value, P=1 or 2, of information about the polarization may be configured for the UE via the higher layer signaling (e.g., RRC signaling).

Advantages of using the partial port are that the CDI feedback overhead can be greatly reduced, and a channel measurement performance can be improved because correlation property between antenna ports is reduced due to an increase in a spacing between the antenna ports.

Accordingly, as an example of configuring the partial port, the partial port may be configured such that a beam is uniformly distributed to all the antenna ports so as to reduce antenna correlation as much as possible.

In another embodiment, the example (N1', N2') may be limited as an antenna port layout used in a legacy codebook. Namely, N1' and N2' may be configured to correspond to 2, 4, 8, 12, and 16 ports used in the legacy codebook. In this case, the UE may report CDI to the base station using the legacy codebook corresponding to N1' and N2' (e.g., legacy 8Tx (8-antenna port) codebook when N1'=4 and N2'=1). At this time, the UE may report information of RI to the base station together.

An example of configuring CDI using the partial port may be applied by replacing N1 by N1' and replacing N2 by N2' in the A-1, A-2, and A-3 schemes proposed above.

The base station may calculate a beamforming coefficient of a beam group using BI (or CDI) reported from the UE and may transmit a beamformed CSI-RS to the UE using the calculated beamforming coefficient. In other words, a precoding matrix set (group) may be determined by PMI reported by the UE, and the base station may transmit the beamformed CSI-RS to the UE by applying a precoding matrix belonging to the precoding matrix set (group) to each CSI-RS.

When the A-1 to A-4 schemes proposed above are used, the present invention proposes a method for selecting preferred CDI by the UE.

1) Signal Power Based Method

The UE can select a best CDI index based on a received signal power (e.g., Reference Signal Received Power (RSRP) or Reference Signal Received Quality (RSRQ)) between the base station and the UE.

2) Signal-to-Interference-Plus-Noise Ratio (SINR) Based Method

The UE can select a best CDI index based on an SINR between the base station and the UE. An SINR for an n-th layer may be represented as in Equation 23 below.

$$SINR_n(r) = \frac{\|w_n(r)h_n(r)\|^2}{\sum_{m \neq n} \|w_n(r)h_m(r)\|^2 + w_n(r)R_{ee}v_n^H(r)} \quad \text{[Equation 23]}$$

Here, $R_{ee}$ is an interference-noise distributed matrix, and w_n denotes a linear receive filter of the n-th layer. h_m denotes a channel between the base station and the UE.

3) Dominant Eigen Vector Based Method

A channel between the base station and the UE is defined as H. Covariance information of the channel is decomposed using Eigen Value Decomposition (EVD) as indicated in Equation 24 below.

$$HH^H = U\Sigma U^H \quad \text{[Equation 24]}$$

Here, $\Sigma$ is a diagonal matrix composed of eigen values, and U is a unitary matrix composed of eigen vectors corresponding to respective eigen values.

Assuming that eigen values are sorted in descending order, the UE may select a maximum eigen value, or K (K>1) large eigen values in descending order, or eigen vector(s) corresponding to a rank of the UE, or a CDI index corresponding to this and may report them to the base station. Because the number of eigen values corresponds to the rank of the UE, the base station may interpret the eigen vectors reported by the UE as the rank of the UE.

4) The base station may inform, in the upper layer signaling (e.g., RRC signaling) or semi-statically, the UE about which metric of the above-described methods 1) to 3) is used to select preferred CDI.

Because the UEs may be uniformly distributed within a cell radius or distributed with a feature of a specific probability, a preferred rank may be different for each UE.

Thus, it may be considered that information (i.e., RI) about the rank is reported being included in the CDI codebook, or the CDI and the RI are separately reported.

1) When the UE Reports Best CDI and Rank

In order to configure beams of various ranks, the base station may configure beamforming using a distributed beam group among the above-described methods. Namely, when the base station transmits beamformed CSI-RS to the UE, a distributed beam group illustrated in FIG. 16 may be used, and a precoding matrix set (group) corresponding to the distributed beam group can be determined by PMI reported by the UE.

Alternatively, when the base station transmits a CSI-RS in a short term in a beamformed scheme (i.e., Class B) in order to ensure a rank of the UE, the beam group (or a precoding matrix set) may be limited so that orthogonal beams as many as the number of ranks are necessarily included.

2) When the UE Reports Best K (K>1) CDIs

The UE may report K CDIs to the base station, and the base station may recognize K beams reported by the UE as ranks. Namely, the base station may recognize the number of CDIs reported by the UE as the number of ranks. When the base station transmits a beamformed CSI-RS to the UE, the base station may include all or some of the K CDIs reported by the UE in the beamforming. Namely, when the base station transmits the beamformed CSI-RS to the UE, all or some of precoding matrixes according to K PMIs reported by the UE may be included in a precoding matrix set (or group) applied to the corresponding beamformed CSI-RS.

3) When the Base Station Informs the UE of the Number of CDIs to be Reported

The base station may inform the UE of the number K of CDIs to be reported by the UE. In this case, the UE may report best K CDIs using one of the above-described three methods, i.e., 'methods for selecting preferred CDI by UE'.

In the case of Rank 2, since two orthogonal beams are generated using Walsh code ([1 1] and [1 −1]), 1 or 4 beam(s) present in a beam group of W1 need not to be orthogonal to each other.

However, in the case of Rank 3 and Rank 4, two minimum orthogonal beams are selected among codewords present in a 2D (e.g., horizontal and vertical) domain to configure a Rank 3 codebook. Further, similar to this, three orthogonal beams are needed in Rank 5 and Rank 6, and four orthogonal beams are needed in Rank 7 and Rank 8.

Accordingly, in the case of CDI codebook proposed by the present invention, a beam group of W1 may be composed of four orthogonal beams.

Figure 19:
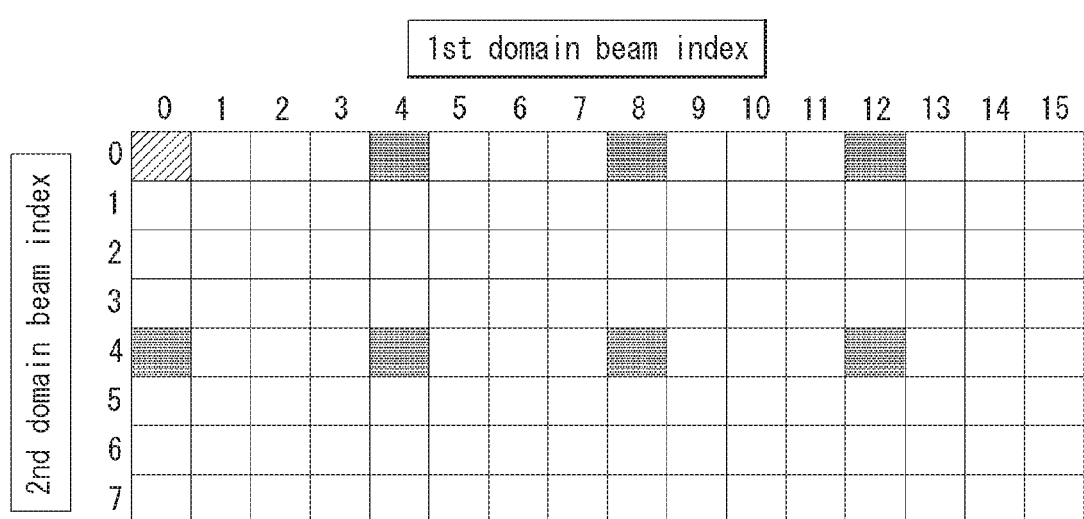
FIG. 19 illustrates an orthogonal 2D beam set (group) according to an embodiment of the present invention.

FIG. 19 illustrates an orthogonal 2D beam set (group) according to an embodiment of the present invention.

In FIG. 19, when $(N_1, N_2, o_1, o_2)=(4, 2, 4, 4)$, a given specific beam $(0, 0)$ (i.e., a specific beam is represented as (first domain beam index, second domain beam index)) and an orthogonal 2D beam set are illustrated.

In one embodiment of a method proposed by the present invention, a codebook may be configured with a beam set (group) of $(4, 0)$, $(8, 0)$, and $(12, 0)$ based on $(0, 0)$.

According to the above method, the codebook may be configured as in Equation 26 or Equation 27 below. Equation 25 indicates a codebook for a cross polarization antenna, and Equation 26 indicates a codebook for a single polarization antenna.

$$W_{m_1,m_2,n} = \frac{1}{\sqrt{8N_1N_2}} \begin{bmatrix} v_{m_1} \otimes u_{m_2} & v_{m_1+o_1} \otimes u_{m_2} & v_{m_1+2o_1} \otimes u_{m_2} & v_{m_1+3o_1} \otimes u_{m_2} \\ \phi_n v_{m_1} \otimes u_{m_2} & \phi_n v_{m_1+o_1} \otimes u_{m_2} & \phi_n v_{m_1+2o_1} \otimes u_{m_2} & \phi_n v_{m_1+3o_1} \otimes u_{m_2} \end{bmatrix}$$
$$= [b_0 \ b_1 \ b_2 \ b_3],$$ [Equation 25]

where $m_1 = 0, 1, \ldots, o_1 N_1 - 1$,
$m_2 = 0, 1, \ldots, o_2 N_2 - 1, \phi_n = \{1, j, -1, -j\}$ $$W_{m_1,m_2,n} = \frac{1}{\sqrt{4N_1N_2}} [v_{m_1} \otimes u_{m_2} \ v_{m_1+o_1} \otimes u_{m_2} \ v_{m_1+2o_1} \otimes u_{m_2} \ v_{m_1+3o_1} \otimes u_{m_2}]$$
$$= [b_0 \ b_1 \ b_2 \ b_3],$$ [Equation 26]

where $m = 0, 1, \ldots, o_1 N_1 - 1, m_2 = 0, 1, \ldots, o_2 N_2 - 1$

Hereinafter, an example where CDI and RI of the UE are reported together upon Class A operation in a hybrid CSI-RS operation of Class A+Class B is described.

In case of dual-codebook (i.e., typical Rel-13 Class A codebook composed of W1 (i.e., a first PMI value i_1) of long-term/wideband property and W2 (i.e., a second PMI value i_2) of short-term/subband property) currently supported in LTE-A, W1 configured according to a rank is different.

Namely, when Rank 1-2 and Rank 3-4 are configured, a beam group of W1 is differently configured. Thus, in the case of Class A+B Hybrid CSI-RS, CDI codebook configuration when RI is reported in conjunction with CDI is proposed.

An example where a CDI codebook uses an Rel-13 Class A codebook or an extension of the codebook (wherein the extension of the codebook means that antenna port layouts N1 and N2 and/or oversampling factors O1 and O2 among codebook (RRC) parameters are extendedly applied) is described.

Equation 25 has a feature that co-phasing information is included in W1. In case of Equation 26, because there is no co-phasing information, the same beam may be applied to each polarization, or a specific co-phasing factor may be used for each polarization.

Equation 25 indicates a codebook configured with a beam set (group) in which a spacing between beams on a first domain is O_1 (or an integer multiple of O_1). Likewise, a codebook may be configured with a beam set (group) in which a spacing between beams on a second domain is O_2 (or an integer multiple of O_2).

When the codebook is used, the base station may select an orthogonal beam suitable for the RI using the reported CDI and RI and may calculate a beamforming coefficient in Class B operation as follows.

1) The base station can configure beamforming in Class B operation by sequentially selecting beams from a CDI codebook according to RI reported from the UE and using the corresponding beam as a beamforming coefficient.

For example, when K=1 and N1=8 in Class B operation and RI=3 in Class A operation, the base station may configure beamforming using beam coefficients corresponding to 1 to 3 columns reported in the CDI codebook at each of three antenna ports configured with X pol (cross polarization). Namely, when the base station transmits a beamformed CSI-RS to the UE, the base station may transmit the beamformed CSI-RS to the UE by applying a precoding matrix corresponding to 1 to 3 columns reported in the CDI codebook to each CSI-RS.

In the case of a remaining one X pol antenna, the base station may calculate a beam coefficient in the form of a linear combination of a beam corresponding to a first column and a beam corresponding to a second column in the CDI codebook. Namely, a precoding matrix may be calculated in the form of a linear combination of a precoding matrix corresponding to the first column and a precoding matrix corresponding to the second column in the CDI codebook.

For example, in Equation 25 or Equation 26, a beam configured according to $(b_1+b_2)/\sqrt{2}$ may be used.

In this instance, a coefficient of the linear combination may be promised in advance between the base station and the UE or signaled to the UE by the base station via the higher layer signaling (e.g., RRC signaling).

By generalizing this, the base station calculates the beamforming coefficient by selecting the number of beams corresponding to RI among four beams of the CDI codebook corresponding to m1 and m2 reported in Class A operation. Namely, precoding matrixes corresponding to the number of RIs may be selected among four precoding matrixes of the CDI codebook.

A port other than a port mapping the beamforming at N1 (or N2 or N1+N2) may be mapped in a linear combination of selected beams on the CDI codebook. Namely, for a remaining antenna port for which a precoding matrix is not defined, a precoding matrix may be calculated by a linear combination of the previously selected precoding matrixes.

The beamforming mapping method can determine a beamforming coefficient in the same manner even when RI=4, 5, 6, 7, and 8. This has an effect of increasing beam resolution/beam granularity of a particular beam direction during beamforming.

a) Or, the base station may calculate a beamforming coefficient by selecting the number of beams corresponding to RI among four beams of the CDI codebook corresponding to m1 and m2 reported in Class A operation. A port other than a port mapping the beamforming at N1 may be mapped to particular beams existing between selected beams on the CDI codebook.

That is, in an example of RI=3, $$\frac{1}{\sqrt{8N_1N_2}}\begin{bmatrix} v_{m_1+o_1/2} \otimes u_{m_2} \\ \phi_n v_{m_1+o_1/2} \otimes u_{m_2} \end{bmatrix} \text{ or }$$

$$\frac{1}{\sqrt{4N_1N_2}}[v_{m_1+o_1/2} \otimes u_{m_2}]$$

may be used instead of $(b_1+b_2)/\sqrt{2}$.

2) In another embodiment, when K=1 and N1=8 in Class B operation, the base station may select one beam (e.g., b1) from the CDI codebook in case of Rank 1-2, select two beams (e.g., b1 and b2) in case of Rank 3-4, select three beams (e.g., b1, b2 and b3) in case of Rank 5-6, and select four beams in case of Rank 7-8, thereby configuring a beamforming coefficient of Class B K=1. Namely, a previously determined number of precoding matrixes corresponding to the number of RIs may be selected among four precoding matrixes of the CDI codebook.

A remaining antenna port other than an antenna port mapping the beamforming at N1 (or N2 or N1+N2) may be mapped in the form of a linear combination of beams on the CDI codebook. Namely, for a remaining antenna port for which a precoding matrix is not defined, a precoding matrix may be calculated by a linear combination of the previously selected precoding matrixes.

Hence, there is an effect of increasing beam granularity of a particular beam direction during beamforming.

a) Or, the base station may calculate a beamforming coefficient by selecting the number of beams corresponding to RI among four beams of the CDI codebook corresponding to m1 and m2 reported in Class A operation. A port other than a port mapping the beamforming at N1 may be mapped to particular beams existing between selected beams on the CDI codebook.

3) In another example, in FIG. 19, a codebook may be configured with a beam set (group) of (0, 0), (4, 0), (0, 4), and (4, 4). Even in this case, 'a method for calculating a beamforming coefficient in Class B operation' according to the above-described 1) and 2) may be equally applied.

Further, a codebook may be configured with a combination of the beam (0, 0) and three beams selected among seven marked beams (i.e., (4, 0), (8, 0), (12, 0), (0, 4), (4, 4), (8, 4), and (12, 4)). Even in this case, 'a method for calculating a beamforming coefficient in Class B operation' according to the above-described 1) and 2) may be equally applied.

In this case, the base station may signal codebook configuration information to the UE via higher layer signaling (e.g., RRC signaling), or the UE may feedback the codebook configuration information to the base station. For example, when a codebook configured with a beam set (group) of {(0, 0), (4, 0), (8, 0), (12, 0)} and a codebook configured with a beam set (group) of {(0, 0), (4, 0), (0, 4), (4, 4)} are used, the base station may signal to the UE what codebook configuration is being used via higher layer signaling (e.g., RRC signaling), or the UE may feedback it to the base station.

When the proposed codebook is used as described above, one codebook is used for all of ranks compared to when a separate codebook is used for each RI in the existing legacy codebook, which is advantageous in reducing overhead and complexity.

Further, the codebook can be well matched even when the UE operates with W2-only feedback (K=1) defined in Rel-13 in Class B operation.

Further, when RI is reported in the above-described scheme, the proposed codebook can be utilized for the purpose of increasing scheduling or beam granularity by adaptively calculating the beamforming coefficient of the Class B to the RI by the base station.

In addition, the proposed codebook can be easily applied to even when RI is not reported. Namely, when K=1 and N1=8 in Class B operation, four beams on the CDI codebook may be used as the beamforming coefficient, two beams may be used as the beamforming coefficient when N1=4, and one beam may be used as the beamforming coefficient when N1=2. In this case, since RI is not reported in Class A, a feedback overhead can be reduced.

Hereinafter, an example of using a legacy codebook in Class A in Hybrid CSI-RS operation of Class A+Class B (K=1) is described.

In this case, in Class A operation, the UE may report PMI (i.e., i1) and RI of a legacy codebook to the base station. In this case, the present invention proposes a method for reinterpreting a role of RI.

1) RI May be Used to Classify Codebooks.

As in '3. CDI codebook without co-phasing' proposed above, a localized beam group is advantageous when the angular spread is small, and a distributed beam group is advantageous when the angular spread is large. Thus, the UE can previously agree with the base station about localized and distributed codebooks and can report using RI so as to classify the localized and distributed codebooks. For example, when RI of Class A is configured with 1 bit, RI can be used to classify the localized and distributed codebooks.

Alternatively, the UE may report distributed information (e.g., information about a beam spacing (p1, p2) of a beam group) of beams of a given beam group using RI. For example, when RI=2, RI may be used as an indicator of (p1, p2)={(1, 1), (o1/2, 1), (1, o2/2), (o1, o2)}.

Further, when a Class A codebook defined in Rel-13 of the legacy codebook or an extension of the Class A codebook is used, a set of beams configured by W1(i1) (i1=(i11, i12), where i11 is a codebook index of N1 domain (i.e., a first domain), and i12 is a codebook index of N2 domain (i.e., a second domain)) is the same at Rank 1-2, at Rank 3-4, and at Rank 5-8.

Accordingly, reliability can be increased by limiting sets of RIs reported from the UE to a specific number (e.g., 3: {rank 1, 2}, {rank 3, 4}, {rank 5-8}). Namely, a value of the RI may be determined as only a value belonging to a previously determined limited set.

Or, when a Class A codebook defined in Rel-13 of the legacy codebook in Class A+Class B (K=1) hybrid operation or an extension of the Class A codebook is used, a value of a subsampled RI may also be applied by UE capability.

Namely, when the UE has two Rx (reception) antenna ports, the maximum number of ranks the UE can support is 2. Further, when the UE has four Rx antenna ports, the maximum number of ranks the UE can support is 4. Further, when the UE has eight Rx antenna ports, the maximum number of ranks the UE can support is 8.

In this case, similar to the example described above, a role of the RI may be reinterpreted (or the RI may be subsampled), and thus the RI may be reinterpreted in Class A operation. Namely, by limiting sets of RIs reported by the UE to the following specific number according to UE capability, a payload size of the reported RI may be set as follows.

If the UE supports up to 2 layers, RI is 0-bit

If the UE supports up to 4 layers, RI is 1-bit, where RI={1, 3} or RI={2, 4}

If the UE supports up to 8 layers, RI is 2-bit, where RI={1, 3, 5, 7} or RI={2, 4, 6, 8}

As described above, whether a first RI is reported may be determined depending on the maximum number of layers supported by the UE. For example, when the maximum number of layers supported by the UE is 2 layers, the first RI may not be reported to the base station (i.e., the number of RI bits is zero).

When the maximum number of layers supported by the UE exceeds 2 layers, the RI may be reported to the base station at 1-bit (if the UE supports up to 8 layers, the RI may be transmitted at 2-bit). In this instance, when the maximum number of layers supported by the UE exceeds 2 layers, the RI may be determined as a value belonging to a set of RI={1, 3} or RI={2, 4} (if the UE supports up to 8 layers, the RI may be determined as a value belonging to a set of RI={1, 3, 5, 7} or RI={2, 4, 6, 8}).

Further, CSI reported by the UE with respect to Class A in Class A+Class B (K=1) hybrid operation is i1 (i.e., W1) and RI, and i1 and RI may be transmitted in the same subframe.

When periodic CSI reporting is used, PUCCH format 2 may be used. In this case, a payload size of i1+RI has a limit of 11-bit. Thus, in this case, by reinterpreting (or subsampling) the RI, the RI can be more effectively applied to the payload size limitation. However, in the case of i1 (i.e., W1), when a Class A codebook or an extension of the Class A codebook is used, a bit size of the entire i1 is affected by an antenna port size and an oversampling factor. Therefore, when Codebook Config 1 of i1 is used, a maximum size may correspond to 12 bits (=log 2(2*32*8*8)) in Rank 3-4.

The codebook configuration is described more detail. If a value of the codebook configuration is given by the base station, a subset of codewords (precoding matrixes) from a codebook may be selected as a set of activated precoding matrixes of i2 value. For example, in the case of the Codebook Config 1, a pair of an index of a first domain and an index of a second domain of a precoding matrix belonging to the set of the precoding matrixes may select a precoding matrix of (x, y). In case of Codebook Config 2, a pair of an index of a first domain and an index of a second domain of a precoding matrix belonging to the set of the precoding matrixes may select precoding matrixes of (x, y), (x+1, y), (x, y+1), and (x+1, y+1). In case of Codebook Config 3, a pair of an index of a first domain and an index of a second domain may select precoding matrixes of (x, y), (x+1, y+1), (x+2, y), and (x+3, y+1). In case of Codebook Config 4, a pair of an index of a first domain and an index of a second domain may select precoding matrixes of (x, y), (x+1, y), (x+2, y), and (x+3, y).

In order to solve the problem caused by limiting the payload size as described above, codebook subsampling may be used.

A codebook subsampling scheme for the Class A+Class B hybrid operation is described below.

1) In case of Rank 1-2, i1 may be composed of i11 and i12 (i.e., i1=i11+i12), where i11 is i1 of N1 domain (i.e., a first domain), and i12 is i1 of N2 domain (i.e., a second domain).

The total size is determined as $\lceil \log_2(N_1 O_1/s_1) \rceil$ in the case of i11 and as $\lceil \log_2(N_2 O_2/s_2) \rceil$ in the case of i12, where s1 and s2 each denote a beam group skipping factor (i.e., spacing between beam groups) of the first domain and the second domain in W1 codebook. Thus, i1 subsampling may be performed as follows.

a) Lower Value Configuration Between O1 and O2

A set of (O1, O2) usable in Rel-13 or Rel-14 is determined as (4, 4), (8, 4) and (8, 8). In the case of Class A in the Class A+Class B hybrid operation, it may be restricted so that (O1, O2) is always configured to (4, 4) (or (4, –) in case of 1D). Alternatively, (O1, O2) may be configured to a lower specific value (e.g., (2, 2)) by the base station via higher layer signaling (e.g., RRC signaling).

Namely, an oversampling factor for configuring the codebook may be limited to a smaller value among oversampling factors for antenna ports of each dimension in a 2D antenna port of the base station.

b) In an example of the above a), it may be signaled by the base station so that only a value of a specific domain is changed. For example, the oversampling factor may be configured so that only the O1 value of the N1 domain (i.e., the first domain) is a low value (i.e., 4).

c) Configuration of s1 and s2

A performance of the entire codebook may be deteriorated as the values of O1 and O2 are reduced. Thus, values of s1 and s2 may be adjusted while maintaining the values of O1 and O2.

The present invention proposes that the values of s1 and s2 be configured to integer multiple of previously configured values of s1 and s2. For example, in the case of the Codebook Config 1, (s1, s2) is configured to (1, 1) for the purpose of codebook subsampling, but the present invention proposes that (s1, s2) be configured to (2, 2) or (4, 4). In this instance, an integer value may be limited to exponentiation power of 2 (e.g., 2, 4, 8, . . . ). That is, a spacing between sets of precoding matrixes in the codebook may be limited to exponentiation power of 2.

d) As a modification of the example of the above c), only a beam skipping factor (i.e., only one of s1 and s2) of a specific domain may be changed. This is because codebook granularity increases in a direction of N1 when N1>N2, subsampling the factor may be more effective in terms of performance.

2) In case of Rank 3-4, an orthogonal beam set of a beam group corresponding to specific i1 is not found in both the two domains N1 and N2 and is limited to one specific domain. Hence, 1-bit can be reduced.

If the previously proposed method 1) is reused as it is in addition to the above method 2), the size of i1 can be further reduced.

3) The previously proposed methods 1) and 2) have been described for Rank 1-4, but may be equally applied to Rank 5-8.

The previously proposed codebook subsampling scheme may be applied to a Class A codebook in which multiple Q-ports newly defined by an extension of Rel-13 is Q>=20, and may be applied to an existing Rel-13 codebook in Hybrid Class A+Class B operation.

Figure 20:
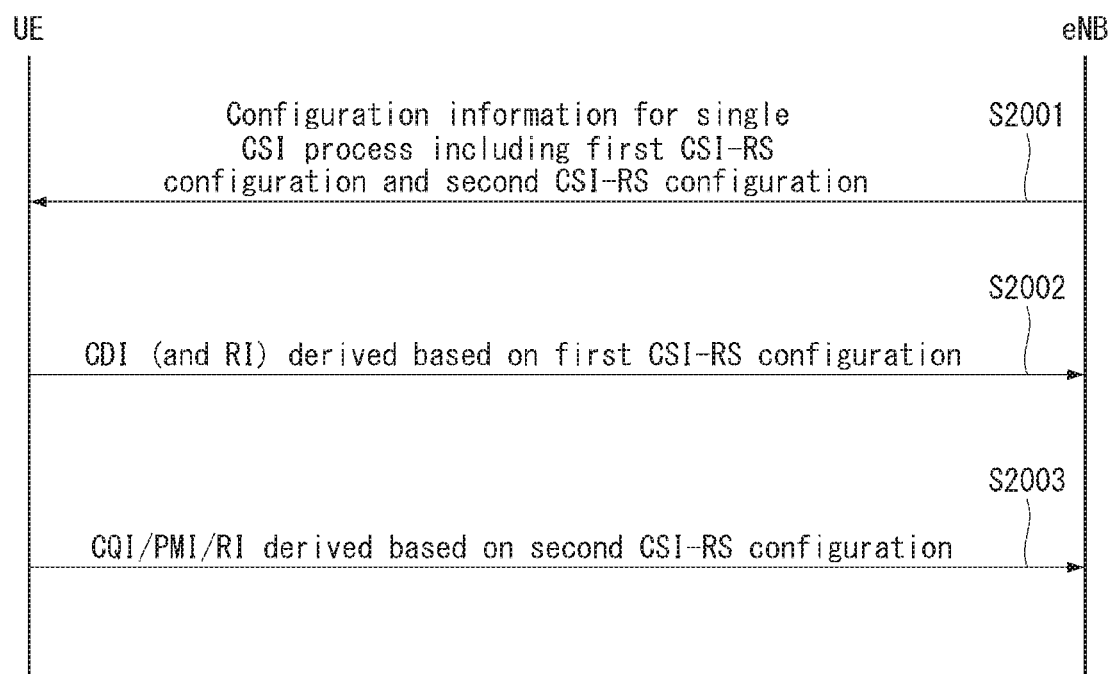
FIG. 20 illustrates a method for transmitting channel state information according to an embodiment of the present invention.

FIG. 20 illustrates a method for transmitting channel state information according to an embodiment of the present invention.

Referring to FIG. 20, the UE receives, from the base station (e.g., eNB), configuration information for a single CSI process including a first CSI-RS configuration and a second CSI-RS configuration in S2001.

In other words, the UE can receive, from the base station, configuration information for single CSI reporting (i.e., the single CSI process. e.g., hybrid CSI reporting) in which CSI reporting using a first CSI-RS (i.e., the first CSI-RS configuration, e.g., non-precoded CSI-RS based CSI reporting) and CSI reporting using a second CSI-RS (i.e., the second CSI-RS configuration, e.g., beamformed CSI-RS based CSI reporting) are combined (or included).

For example, the first CSI-RS configuration is a non-precoded CSI-RS type (i.e., Class A) and may be associated with one CSI-RS resource and one CSI-IM resource. Alternatively, the first CSI-RS configuration may be associated with K CSI-RS resources of a beamformed CSI-RS type (i.e., Class B), where K is greater than 1.

Further, the second CSI-RS configuration may be associated with one CSI-RS resource of the beamformed CSI-RS type (i.e., Class B).

The UE reports CDI (or BI or CRI or PMI) derived based on the first CSI-RS configuration (e.g., non-precoded CSI-RS) to the base station in S2002.

The UE can configure a CDI codebook in the scheme described above. The UE can select the CDI (or BI or CRI or PMI) corresponding to a beam (or precoding matrix) preferred by the UE from the configured codebook. The UE can report the selected CDI (or BI or CRI or PMI) to the base station.

If the first CSI-RS configuration in hybrid CSI is configured for Class B, the first CSI-RS configuration may correspond to Class B CSI-RS configuration having the K (>1) CSI-RS resources (i.e., CSI-RS resources to which the beamformed CSI-RSs are mapped). Namely, the base station may map the beamformed CSI-RS to each of the K CSI-RS resources and transmit it to the UE, and the UE may select one preferred CSI-RS resource (i.e., beam) among the received K CSI-RS resources (i.e., the K beamformed CSI-RSs) and may report CRI (or CDI or BI) to the base station.

If the first CSI-RS configuration in hybrid CSI is configured for Class A, the base station may transmit a CSI-RS to the UE using multiple antenna ports on one CSI-RS resource, and the UE may select a preferred precoding matrix from a previously defined codebook based on the CSI-RS transmitted from the received CSI-RS resource and may report a PMI (in this case, the PMI may be composed of a first PMI (W1 or i_1) and a second PMI (W2 or i_2)) corresponding to the selected precoding matrix to the base station.

In addition, the UE may report a first RI together with the PMI (i.e., the first PMI) to the base station.

A value of the first RI may be determined as only a value belonging to a previously determined set (e.g., {1, 3}).

Whether the first RI is reported may be determined depending on the maximum number of layers supported by the UE. For example, when the maximum number of layers supported by the UE is 2 layers, the first RI may not be reported to the base station (i.e., the number of RI bits is zero). As another example, when the maximum number of layers supported by the UE exceeds 2 layers, the first RI may be reported to the base station at 1-bit. In this instance, when the maximum number of layers supported by the UE exceeds 2 layers, the first RI may be determined as a value belonging to a set {1, 3}.

The UE reports CQI, a second PMI, and a second RI derived based on the second CSI-RS configuration (e.g., beamformed CSI-RS) to the base station in S2003.

In the step S2002, the UE may select the first PMI from the previously determined codebook and report the first PMI. A set of precoding matrixes may be determined within the codebook by the first PMI reported as described above, and the beamformed CSI-RS may be applied to a precoding matrix belonging to the set of precoding matrixes.

For example, the first PMI may be selected in a codebook for an antenna port or some antenna ports of one dimension in a 2-dimensional antenna port array of the base station. Further, the first PMI may be selected in a codebook without co-phasing.

The first PMI may be selected in a codebook composed of only precoding matrixes for forming an orthogonal beam. In this case, a precoding matrix corresponding to the number of RIs reported by the UE may be selected in the codebook to constitute a set of precoding matrixes.

In the antenna port array of the base station, a precoding matrix for an antenna port which is not mapped to the set of precoding matrixes may be derived by a linear combination of precoding matrixes belonging to the set of precoding matrixes. Alternatively, in the antenna port array of the base station, a precoding matrix for an antenna port which is not mapped to the set of precoding matrixes may be determined as one of precoding matrixes belonging to the set of precoding matrixes.

General Device to which the Present Invention is Applicable

Figure 21:
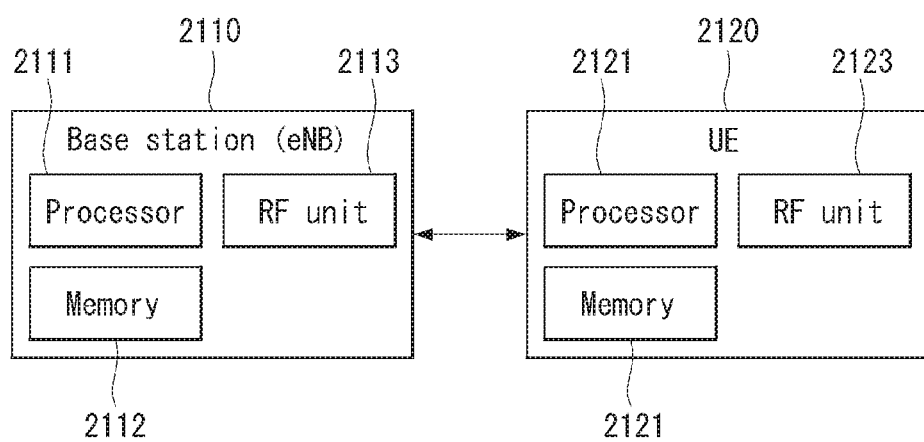
FIG. 21 is a block diagram illustrating configuration of a wireless communication device according to an embodiment of the present invention.

FIG. 21 is a block diagram illustrating configuration of a wireless communication device according to an embodiment of the present invention.

Referring to FIG. 21, a wireless communication system includes a base station 2110 and a plurality of UEs 2120 located within an area of the base station 2110.

The base station 2110 includes a processor 2111, a memory 2112, and a radio frequency (RF) unit 2113. The processor 2111 implements functions, processes, and/or methods proposed with reference to FIGS. 1 to 20. Layers of a radio interface protocol may be implemented by the processor 2111. The memory 2112 is connected to the processor 2111 and stores various information for driving the processor 2111. The RF unit 2113 is connected to the processor 2111 and transmits and/or receives radio signals.

The UE 2120 includes a processor 2121, a memory 2122, and an RF unit 2123. The processor 2121 implements functions, processes, and/or methods proposed with reference to FIGS. 1 to 20. Layers of a radio interface protocol may be implemented by the processor 2121. The memory 2122 is connected to the processor 2121 and stores various information for driving the processor 2121. The RF unit 2123 is connected to the processor 2121 and then transmits and/or receives radio signals.

The memory 2112, 2122 may be provided inside or outside the processor 2111, 2121 and may be connected to the processor 2111, 2121 by various well-known means. Moreover, the base station 2110 and/or the UE 2120 may have a single antenna or multiple antennas.

The embodiments described above are implemented by combinations of components and features of the present invention in predetermined forms. Each component or feature should be considered selectively unless specified separately. Each component or feature may be carried out without being combined with another component or feature. Moreover, some components and/or features are combined with each other and can implement embodiments of the present invention. The order of operations described in embodiments of the present invention may be changed. Some components or features of one embodiment may be included in another embodiment, or may be replaced by corresponding components or features of another embodiment. It will be apparent that some claims referring to specific claims may be combined with another claims referring to the other claims other than the specific claims to constitute the embodiment or add new claims by means of amendment after the application is filed.

Embodiments of the present invention can be implemented by various means, for example, hardware, firmware, software, or combinations thereof. When embodiments are implemented by hardware, one embodiment of the present invention can be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and the like.

When embodiments are implemented by firmware or software, one embodiment of the present invention can be implemented by modules, procedures, functions, etc. performing functions or operations described above. Software code can be stored in a memory and can be driven by a processor. The memory is provided inside or outside the processor and can exchange data with the processor by various well-known means.

While the present invention has been described and illustrated herein with reference to the preferred embodiments thereof, it will be apparent to those skilled in the art that various modifications and variations can be made therein without departing from the spirit and scope of the present invention. Thus, it is intended that the present invention covers the modifications and variations of this invention that come within the scope of the appended claims and their equivalents.

INDUSTRIAL APPLICABILITY

Although the present invention is described with reference to examples applying to a 3GPP LTE/LTE-A system, it may be applied to various wireless communication systems other than the 3GPP LTE/LTE-A system.

What is claimed is:

1. A method of reporting channel state information (CSI), by a User Equipment (UE), in a multi-antenna wireless communication system, the method comprising:

receiving, from a base station, configuration information for CSI reporting based on Class A and Class B; and reporting, to the base station, the CSI related to at least one of the Class A and/or the Class B based on the configuration information, wherein the CSI includes at least one of a Precoding Matrix Indicator (PMI) for the Class A, a Rank Indicator (RI) for the Class A, a Channel Quality Indicator (CQI) for the Class B, a PMI for the Class B, and/or a RI for the Class B, wherein a value of the RI for the Class A is determined as a value only belonging to a previously determined set, based on the RI for the Class A being reported, wherein whether or not the RI for the Class A is reported is determined depending on a maximum number of layers supported by the UE, and wherein the Class A is a type for CSI reporting based on a non-precoded CSI-RS.

2. The method of claim 1, wherein based on the maximum number of layers supported by the UE being 2 layers, the RI for the Class A is not reported to the base station.

3. The method of claim 1, wherein based on the maximum number of layers supported by the UE exceeding 2 layers, the RI for the Class A is reported to the base station at 1-bit.

4. The method of claim 1, wherein based on the maximum number of layers supported by the UE exceeding 2 layers, the RI for the Class A is determined as a value belonging to a set $\{1, 3\}$.

5. The method of claim 1, wherein the Class B is a type for CSI reporting based on a beamformed CSI-RS.

6. The method of claim 1, wherein at least one of the PMI for the Class A, and/or the RI for the Class A are derived based on a non-precoded CSI-RS for Class A.

7. The method of claim 1, wherein at least one of the CQI for the Class B, the PMI for the Class B, and/or the RI for the Class B are derived based on a beamformed CSI-RS for Class B.

8. A User Equipment (UE) for reporting channel state information (CSI) in a multi-antenna wireless communication system, the UE comprising:
a transceiver;
at least one processor; and
at least one computer memory operably connectable to the at least one processor and storing instructions that, when executed by the at least one processor, perform operations comprising:
receiving, from a base station, configuration information for CSI reporting based on Class A and Class B; and
reporting, to the base station, the CSI related to at least one of the Class A and/or the Class B based on the configuration information,
wherein the CSI includes at least one of a Precoding Matrix Indicator (PMI) for the Class A, a Rank Indicator (RI) for the Class A, a Channel Quality Indicator (CQI) for the Class B, a PMI for the Class B, and/or a RI for the Class B,
wherein a value of the RI for the Class A RI is determined as a value only belonging to a previously determined set, based on the RI for the Class A being reported,
wherein whether or not the RI for the Class A is reported is determined depending on a maximum number of layers supported by the UE, and
wherein the Class A is a type for CSI reporting based on a non-precoded CSI-RS.

9. A method of receiving channel state information (CSI), by a base station, in a multi-antenna wireless communication system, the method comprising:
transmitting, to a User Equipment (UE), configuration information for CSI reporting based on Class A and Class B; and
receiving, from the UE, the CSI related to at least one of the Class A and/or the Class B based on the configuration information,
wherein the CSI includes at least one of a Precoding Matrix Indicator (PMI) for the Class A, a Rank Indicator (RI) for the Class A, a Channel Quality Indicator (CQI) for the Class B, a PMI for the Class B, and/or a RI for the Class B,
wherein a value of the RI for the Class A RI is determined as a value only belonging to a previously determined set, based on the RI for the Class A being reported,
wherein whether or not the RI for the Class A is reported is determined depending on a maximum number of layers supported by the UE, and
wherein the Class A is a type for CSI reporting based on a non-precoded CSI-RS.

10. A base station for receiving channel state information (CSI) in a multi-antenna wireless communication system, the base station comprising:
a transceiver;
at least one processor; and
at least one computer memory operably connectable to the at least one processor and storing instructions that, when executed by the at least one processor, perform operations comprising:
transmitting, to a User Equipment (UE), configuration information for CSI reporting based on Class A and Class B; and
receiving, from the UE, the CSI related to at least one of the Class A and/or the Class B based on the configuration information,
wherein the CSI includes at least one of a Precoding Matrix Indicator (PMI) for the Class A, a Rank Indicator (RI) for the Class A, a Channel Quality Indicator (CQI) for the Class B, a PMI for the Class B, and/or a RI for the Class B,
wherein a value of the RI for the Class A RI is determined as a value only belonging to a previously determined set, based on the RI for the Class A being reported,
wherein whether or not the RI for the Class A is reported is determined depending on a maximum number of layers supported by the UE, and
wherein the Class A is a type for CSI reporting based on a non-precoded CSI-RS.

* * * * *